US012759793B2

(12) United States Patent
Almogy et al.

(10) Patent No.: US 12,759,793 B2
(45) Date of Patent: Oct. 13, 2026

(54) SYSTEMS AND METHODS FOR DISPENSING ITEMS

(71) Applicant: Fulfil Solutions, Inc., Mountain View, CA (US)

(72) Inventors: Gilad Almogy, Mountain View, CA (US); Jason Kalus, Mountain View, CA (US); Eric Yehl, Mountain View, CA (US); Stephen Burke, Mountain View, CA (US); Brock Csira, Mountain View, CA (US); Michael Starkey, Mountain View, CA (US); Peter Yu, Mountain View, CA (US); Leland Kirshen, Mountain View, CA (US); Adam Medla, Mountain View, CA (US); Amber Thomas, Mountain View, CA (US); Arni Lehto, Mountain View, CA (US); Allen Tang, Mountain View, CA (US); Nathan Beckett, Mountain View, CA (US); Christopher Culter, Mountain View, CA (US); David Cameron Hosken, Mountain View, CA (US)

(73) Assignee: Fulfil Solutions, Inc, Mountain View, CA (US)

( * ) Notice: Subject to any disclaimer, the term of this patent is extended or adjusted under 35 U.S.C. 154(b) by 58 days.

(21) Appl. No.: 18/938,149

(22) Filed: Nov. 5, 2024

(65) Prior Publication Data

US 2025/0136376 A1 May 1, 2025

Related U.S. Application Data

(63) Continuation of application No. 18/525,601, filed on Nov. 30, 2023, now Pat. No. 12,162,683, which is a (Continued)

(51) Int. Cl.

*B65G 1/10* (2006.01)
*B65B 25/04* (2006.01)

(Continued)

(52) U.S. Cl.

CPC ................ *B65G 1/10* (2013.01); *B65B 25/04* (2013.01); *B65G 1/02* (2013.01); *B65G 1/04* (2013.01);

(Continued)

(58) Field of Classification Search

CPC .......... B65G 1/10; B65G 1/1375; B65G 1/02; B65G 1/1376; B65G 17/002; B65G 1/04;

(Continued)

(56) References Cited

U.S. PATENT DOCUMENTS 4,570,806 A * 2/1986 Dushenko ................ B65G 1/02 206/557
6,503,044 B1 * 1/2003 Enenkel .................. B65B 69/00 414/404

(Continued)

*Primary Examiner* — James R Bidwell

(74) *Attorney, Agent, or Firm* — Run8 Patent Group, LLC; Peter Miller; Marissa Kohrman

(57) ABSTRACT

The present disclosure provides systems and methods for product handling and dispensing. In one aspect, the present disclosure provides a system comprising a plurality of storage units for storing one or more trays comprising one or more items; one or more dispense conveyors for lifting and dispensing at least one of the one or more items into one or more receiving units; and a shuttle comprising one or more tray retrieval mechanisms, wherein the shuttle is (a) movable relative to the plurality of storage units and (b) configured to (i) pick at least one tray of the one or more trays using the one or more tray retrieval mechanisms and (ii) transport the at least one tray to the one or more dispense conveyors.

20 Claims, 14 Drawing Sheets

Related U.S. Application Data continuation of application No. PCT/US2022/032013, filed on Jun. 2, 2022.

(60) Provisional application No. 63/196,527, filed on Jun. 3, 2021.

(51) Int. Cl.

| | |
|---|---|
| ***B65B 35/02*** | (2006.01) |
| ***B65G 1/02*** | (2006.01) |
| ***B65G 1/04*** | (2006.01) |
| ***B65G 1/137*** | (2006.01) |
| ***B65G 17/00*** | (2006.01) |
| ***B65G 47/64*** | (2006.01) |

(52) U.S. Cl.

CPC ......... *B65G 1/1376* (2013.01); *B65G 17/002* (2013.01); *B65B 35/02* (2013.01); *B65G 47/642* (2013.01); *B65G 2201/0258* (2013.01); *B65G 2207/46* (2013.01)

(58) Field of Classification Search

CPC .......... B65G 47/642; B65G 2201/0258; B65G 2207/46; B65B 25/04; B65B 5/101; B65B 35/02

USPC ........................................................ 198/468.6

See application file for complete search history.

(56) References Cited

U.S. PATENT DOCUMENTS

| | | | | |
|---|---|---|---|---|
| 12,162,683 | B2 * | 12/2024 | Almogy | B65G 1/02 |
| 2006/0042194 | A1 * | 3/2006 | Lucido | B65G 47/82<br>53/448 |
| 2014/0212252 | A1 * | 7/2014 | Huff | B65D 1/34<br>414/416.06 |
| 2019/0152634 | A1 * | 5/2019 | Almogy | B65B 25/04 |
| 2020/0231384 | A1 * | 7/2020 | Lisso | B65G 1/0492 |
| 2021/0147146 | A1 * | 5/2021 | Conrad | B65G 1/0492 |

* cited by examiner

Chain Dispense Concepts - Bead Chain

Tray with 1x Type A lane, 3x type B lane

SYSTEMS AND METHODS FOR DISPENSING ITEMS

CROSS REFERENCE

This application is a continuation of U.S. patent application Ser. No. 18/525,601, filed on 1 Nov. 2023, which is a 371 application of International Patent Application No. PCT/US2022/032013, filed on 2 Jun. 2022, which claims priority to U.S. Provisional Patent Application No. 63/196,527, filed on 3 Jun. 2021, each of which is incorporated its entirety by this reference.

BACKGROUND

Efficient handling of multiple items with a variety of different shapes and/or sizes can pose an increasingly complex technological challenge. Items having different shapes and/or sizes may require different product handling and packaging solutions tailored to the specific characteristics and properties of the items. Further, different items may require different storage environments to ensure that the quality of such items do not degrade over time.

SUMMARY

Product handling systems can be used to facilitate transfer of individual product items from incoming bulk form into dedicated trays for subsequent inspection, sorting, selection, and packaging for consumption. Inspection may comprise interrogation of product items within a tray by electromagnetic (e.g., optical, hyperspectral) or other (e.g., physical, acoustic, gas sensing, etc.) techniques. Prior to packaging, product items disposed within the tray may be stored in a moveable carousel that is responsible for controlling environmental factors such as temperature, humidity, illumination, ambient gases, product-to-product interactions, and/or others. Movement of product items from a carousel's transfer station to an outside staging position may be accomplished using robots and/or conveyor belts. The systems and methods of the present disclosure may allow rapid, low-cost consumer selection of specific individual product items based upon their accompanying metadata (e.g., source, identifier), in combination with the results of inspection (e.g., visual appearance).

Recognized herein are various limitations with product handling and packaging systems currently available. The present disclosure provides various systems and methods for handling, tracking, and dispensing items to ensure accurate and efficient fulfillment of customer orders.

In an aspect, the present disclosure provides a product handling system comprising: a tray comprising one or more lanes and one or more openings disposed on a bottom surface of the tray; one or more supports positioned within at least one of the one or more lanes, wherein the one or more supports are configured to support one or more items; and one or more dispensing units comprising one or more dispensing arms, wherein the one or more dispensing arms are configured to (i) couple to, engage with, or lift the one or more supports and (ii) transport (a) the one or more supports, (b) the one or more items on the one or more supports, or (c) both the one or more supports and the one or more items to one or more receiving areas or receiving units.

In some embodiments, the one or more dispensing arms are configured to move through the one or more openings to lift the one or more supports and the one or more items on the one or more supports and (ii) transport the one or more supports and the one or more items to one or more receiving units. In some embodiments, the one or more supports are configured to support the one or more items as the one or more items are transported to the one or more receiving units.

In some embodiments, the one or more dispensing units comprise one or more conveyor belts. In some embodiments, the one or more conveyors belts of the one or more dispensing units are configured to move in a first direction, thereby causing a movable portion of the one or more supports to move in a second direction to transport the one or more items towards the one or more receiving units for dispensing. In some embodiments, the second direction is different than the first direction. In some embodiments, the one or more dispensing arms are configured to translate towards the one or more receiving units.

In some embodiments, the one or more supports are configured to move away from the tray as the one or more dispensing arms transport the one or more supports and the one or more items on the one or more supports towards the one or more receiving units. In some embodiments, the one or more supports comprise an alignment block configured to couple the one or more supports to the one or more dispensing arms.

In some embodiments, the one or more supports comprise a flexible element configured to support the one or more items. In some embodiments, the flexible element comprises a belt that is configured to extend around or along a portion of the one or more dispensing arms.

In some embodiments, the system further comprises a rolling element configured to direct at least a portion of the flexible element in a predetermined direction as the flexible element moves relative to the one or more dispensing arms. In some embodiments, the rolling element is integrated with the one or more receiving units.

In some embodiments, the system further comprises an engagement mechanism configured to couple the flexible element to a portion of the one or more dispensing units. In some embodiments, the engagement mechanism comprises a latch or a magnet. In some embodiments, the engagement mechanism comprises a pin or a protrusion configured to engage with a portion or component of the one or more dispensing units. In some embodiments, the one or more dispensing arms comprise a bead chain, a slotted chain link, a belt, a round belt, or a flat belt.

In some embodiments, the movable portion of the one or more supports comprise a conveyor belt. In some embodiments, the one or more supports comprise one or more features to prevent the one or more items from moving or dropping while the one or more items are being transported. In some embodiments, the one or more features comprise one or more side walls, grooves, bumps, or protrusions.

In some embodiments, the one or more supports are liftable or movable relative to the tray. In some embodiments, the one or more supports are configured to drop off the one or more conveyors when conveyed past a distal end of the one or more conveyors. In some embodiments, the one or more supports comprise a plate with a plurality of slots through which the one or more dispensing units can extend or move to (i) contact the one or more items and (ii) transport the one or more items to the one or more receiving units or receiving areas. In some embodiments, transporting the one or more items comprises sliding the one or more items along the plate and over an edge of the tray. In some embodiments, the system further comprises a weighted shovel configured to slide adjacent to the plate to push the one or more items along a surface of the plate. In some embodiments, the one or more supports comprise a plate with a plurality of slots. In some embodiments, the one or more dispensing units comprise a plurality of rollers configured to protrude through the plurality of slots to contact and transport or dispense the one or more items.

In another aspect, the present disclosure provides a system for handling and dispensing items. The system may comprise: a support configured to hold a plurality of items in a predetermined orientation; a movable plate configured to (i) contact at least one item of the plurality of items and (ii) displace the plurality of items towards a bag or a packing unit to dispense one or more items of the plurality of items into the bag or the packaging unit; and a gating mechanism configured to selectively permit or restrict a dispensing of the one or more items. In some embodiments, the support is configured to hold the plurality of items in a vertical or upright configuration. In some embodiments, the plurality of items in the vertical or upright position are oriented such that a first surface of the plurality of items contacts the support and a second surface of the plurality of items does not contact the support. In some embodiments, a surface area of the first surface is less than a surface area of the second surface. In some embodiments, the plurality of items have a thin or flat form factor. In some embodiments, the movable plate is configured to translate towards the bag or the packaging unit to displace the plurality of items towards the bag or the packaging unit. In some embodiments, the movable plate is configured to ratchet forward to displace the plurality of items. In some embodiments, the system may further comprise a drive unit for driving the movable plate. In some embodiments, the drive unit comprises a chain. In some embodiments, the chain comprises a bead chain. In some embodiments, the support further comprises one or more movable sidewalls that are adjustable to modify a width of the support. In some embodiments, the one or more movable sidewalls are adjustable based on a width of the plurality of items. In some embodiments, the gating mechanism comprises one or more rollers or brushes. In some embodiments, the one or more rollers or brushes are configured for singulation of the one or more items during the dispensing of the one or more items. In some embodiments, the system may further comprise one or more dividers for partitioning a first subset of the plurality of items from a second subset of the plurality of items.

In another aspect, the present disclosure provides a system comprising one or more imaging devices configured to capture a plurality of data streams comprising at least (i) a first data stream comprising a plurality of images or videos of one or more items in a first location and (ii) a second data stream comprising a plurality of images or videos of the one or more items in a second location; and a processor configured to generate a filtered set of images or videos using the first data stream and the second data stream, wherein the filtered set of images or videos correspond to (a) one or more characteristics or properties of the one or more items, (b) one or more components or subsystems associated with a storage, handling, or dispensing of the one or more items, or (c) one or more parameters associated with the storage, handling, or dispensing of the one or more items.

In some embodiments, the first location comprises a tray, a container, or a case in which the one or more items are stored before the one or more items are dispensed. In some embodiments, the second location comprises a receiving area or a receiving unit configured to receive the one or more items after the one or more items are dispensed.

In some embodiments, the first location comprises a tray, a container, or a case in which the one or more items are stored after the one or more items are inducted and before the one or more items are received at or placed in a storage area or a storage unit. In some embodiments, the second location comprises a tray, a container, or a case in which the one or more items are stored before the one or more items are dispensed.

In some embodiments, the one or more components comprise a tray, a tray storage unit comprising the tray, a dispensing unit, a conveyance unit, or a receiving unit.

In some embodiments, the one or more characteristics or properties of the one or more items comprise a packaging type, a product type, a product shape, a product category, a product material, a packaging material, a product dimension, a product weight, or a stock keeping unit (SKU) associated with the one or more items. In some embodiments, the one or more characteristics or properties of the one or more items comprise an optical property, wherein the optical property comprises a reflectance or a reflectivity of the items or a packaging of the items. In some embodiments, the one or more characteristics or properties of the one or more items comprise (i) a drip risk or a spoilage risk, (ii) a designation of whether the one or more items are packaged, unpackaged, a food, or a non-food, or (iii) a designation of a type of food or a type of non-food for the one or more items.

In some embodiments, the one or more parameters comprise (i) an order associated with the one or more items, (ii) a dispense sequence of the one or more items, (iii) a state of a receiving unit, a tray, or the one or more items before, during, and after the one or more items are transported from the tray or dispensed into or onto the receiving unit, (iv) a failure detected with a removal of the one or more items from the tray or a dispensing of the one or more items, or (v) a detection of one or more items in or on the receiving unit.

In some embodiments, the first data stream comprises one or more images or videos of a tray comprising the one or more items before the one or more items are transported from the tray or dispensed. In some embodiments, the first data stream comprises one or more images or videos of the tray after the one or more items are transported from the tray or dispensed. In some embodiments, the second data stream comprises one or more images or videos of a receiving unit before the one or more items are dispensed into or onto the receiving unit. In some embodiments, the second data stream comprises one or more images or videos of the receiving unit after the one or more items are dispensed into or onto the receiving unit.

In some embodiments, the filtered set of images or videos are organized in a chronological order. In some embodiments, the filtered set of images or videos are generated using a third data stream comprising (i) a plurality of images or videos of a dispense unit transporting the one or more items from a tray or dispensing the one or more items into or onto a receiving unit, or (ii) sensor data obtained during an induction, storage, transportation, handling, or dispensing of the one or more items. In some embodiments, the processor is configured to track or detect a type of items dispensed, a quantity of items dispensed, a dispense location for each item, a success rate of dispensing the item in a target location, a movement of the item during dispense, or one or more properties of the one or more items, based on the filtered set of images. In some embodiments, the one or more properties comprise a dimension, a shape, a color, a size, a weight, a material, or a material property of the one or more items.

In some embodiments, the processor is further configured to perform object tracking to isolate the one or more items from a background feature. In some embodiments, the processor is further configured to implement or perform blob detection, edge detection, contour detection, depth masking, or one or more filtering techniques to determine one or more attributes of the one or more items and to detect a quantity, an orientation, or a location of the one or more items. In some embodiments, the processor is further configured to filter out background features based on a color, hue, tint, tone or shade of the background features. In some embodiments, the processor is further configured to filter out the background features by (i) transforming the plurality of images from a red green blue (RGB) color space to a hue saturation value (HSV) color space or (ii) comparing depths using one or more depth point clouds. In some embodiments, the processor is further configured to implement a mixture of Gaussians algorithm for object tracking. In some embodiments, the processor is configured to determine a probability distribution of where the one or more items are located or dispensed in or on a receiving unit, based on the plurality of images, the one or more depth point clouds, and a target location for dispensing the one or more items.

In some embodiments, the one or more imaging devices comprise a depth sensor or an RGB sensor. In some embodiments, the one or more imaging devices are configured to capture the one or more images or videos before, during, or after the one or more items are dispensed into the receiving unit.

In some embodiments, the processor is configured to automatically detect if the one or more items are successfully dispensed. In some embodiments, the processor is configured to compare the filtered set of images to a customer order to verify successful dispensing of the one or more items. In some embodiments, the processor is configured to use at least the filtered set of images to train one or more machine learning models to confirm dispense accuracy and detect dispense errors. In some embodiments, the processor is configured to train the one or more machine learning models based on a property or a characteristic of the one or more dispensed items in combination with human labeling, which property or characteristic is determined based on one or more images or videos from the first data stream or the second data stream. In some embodiments, the processor is further configured to provide at least a subset of the plurality of images or videos to an operator for order verification upon detecting an error or an inconsistency between two or more dispense sensors. In some embodiments, the processor is configured to use the subset of images to train one or more machine learning models.

In some embodiments, the system may further comprise a communications module configured to provide the filtered set of images to a customer to provide live updates during order fulfilment and to allow the customer to (i) check for fulfilment accuracy, quality, or item damage, or (ii) provide live feedback on an order fulfilment process. In some embodiments, the processor is configured to build an order fulfillment history based on the filtered set of images and to identify a dispense routine that caused an error. In some embodiments, the error corresponds to a missing item, a wrong item, or an extra item. In some embodiments, the processor is configured to determine one or more quality issues with one or more items that are damaged during dispensing, based on the filtered set of images. In some embodiments, the processor is configured to use computer vision to detect one or more dispensing actions that cause damage to the one or more items, based on one or more interactions between the one or more items during dispensing. In some embodiments, the one or more machine learning models are configured to determine when one or more items having a high risk of interaction are dispensed, based on one or more properties or attributes of the one or more items. In some embodiments, the high risk of interaction corresponds to a risk of spilling, a risk of damaging the one or more items, a risk of damaging an item packaging, or a puncture in an item or an item packaging.

In some embodiments, the system may further comprise an imaging unit configured to image the one or more items during item induction or item storage to evaluate item quality. In some embodiments, the processor is configured to verify quality, ripeness, temperature, correct item type, quantity, position, orientation, seating, or placement in the one or more trays based on the first data stream or the second stream or both.

In some embodiments, the system may further comprise an imaging unit configured to monitor a movement or a navigation of one or more robots and to provide one or more corrective adjustments to the one or more robots based on the monitored movement or navigation.

In some embodiments, the system may comprise one or more sensors for monitoring or tracking the one or more items, wherein the one or more sensors are selected from the group consisting of pressure sensors, optical sensors, depth sensors, and thermal sensors. In some embodiments, the pressure sensors are disposed (i) in or on a receiving unit configured to receive the one or more items or (ii) on a dispense mechanism for dispensing the one or more items. In some embodiments, the optical sensors are disposed (i) at an end of a dispensing arm of a dispense mechanism for dispensing the one or more items or (ii) above a receiving unit configured to receive the one or more items.

In some embodiments, at least one of the first data stream and the second data stream comprises images or videos of a tray comprising the one or more items before the items are lifted from the tray. In some embodiments, at least one of the first data stream and the second data stream comprises images or videos of the one or more items after the items are lifted from the tray using a dispense mechanism and before the one or more items are dispensed. In some embodiments, at least one of the first data stream and the second data stream comprises images or videos of the one or more items as the one or more items are transported back to a tray after a subset of the one or more items are dispensed using a dispense mechanism. In some embodiments, the first data stream is captured using a first imaging device of the one or more imaging devices and the second data stream is captured using a second imaging device of the one or more imaging devices. In some embodiments, the first data stream and the second data stream are captured using a same imaging device of the one or more imaging devices. In some embodiments, the first data stream and the second data stream are captured using different imaging devices of the one or more imaging devices. In some embodiments, at least one of the first data stream or the second data stream comprises one or more images or videos of the one or more items as the one or more items are being dispensed. In some embodiments, the one or more properties comprise information that is derivable by reading or interpreting a label associated with or affixed to the one or more items. In some embodiments, the information derivable from the label comprises a product code, product name, product weight, product expiration date, product ingredients, and/or product nutritional information.

In another aspect, the present disclosure provides a system comprising: a plurality of storage units configured to hold or store a plurality of items; a plurality of receiving units configured to travel to one or more of the plurality of storage units along one or more adjustable paths to receive or pick one or more items of the plurality of items; and one or more processors configured to continuously modify or update an operation of the automated fulfillment system based on heuristics and an optimization algorithm that optimizes one or more order fulfilment metrics based on a state of (i) the automated fulfillment system or (ii) one or more components or subsystems of the automated fulfillment system. In some embodiments, modifying or updating the operation of the automated fulfillment system comprises (i) modifying or updating the one or more adjustable paths for at least one receiving unit of the plurality of receiving units, (ii) modifying or updating a dispense sequence for one or more items, or (iii) modifying or updating a sequence in which one or more orders are fulfilled.

In some embodiments, the state of the automated fulfillment system comprises (i) an availability of the one or more items at the storage units or (ii) an availability of one or more of the plurality of receiving units to receive the one or more items. In some embodiments, the state of the automated fulfillment system comprises a location or a distribution of the one or more items in or across the automated fulfillment system or one or more subsystems of the automated fulfillment system. In some embodiments, the state of the automated fulfillment system comprises a present state or a simulated future state. In some embodiments, the simulated future state is usable to inform one or more decisions or operations associated with the storage, handling, and dispensing of the one or more items. In some embodiments, the simulated future state is usable to (i) generate one or more predictions associated with future orders or additional future states and (ii) adjust the operation of the automated fulfillment system based on the one or more predictions.

In some embodiments, the one or more processors are configured to determine one or more expected future states for the automated fulfillment system based on a current state of the automated fulfillment system. In some embodiments, the one or more processors are configured to simulate a progression or a rollout from a current state to a future state based on one or more deterministic or probabilistic events. In some embodiments, the one or more processors are configured to determine the present state or the simulated future state by applying one or more machine learning algorithms.

In some embodiments, the plurality of storage units comprise a movable mechanism for dispensing the one or more items to one or more receiving units of the plurality of receiving units. In some embodiments, the plurality of receiving units comprise a movable mechanism for retrieving or picking the one or more items from the plurality of storage units.

In some embodiments, the one or more order fulfilment metrics comprise throughput, output efficiency, order fulfilment speed, packing density, or item compatibility. In some embodiments, the one or more modified or updated paths are optimized to reduce a probability of item damage during or after a dispense routine, avoid or mitigate an occurrence of one or more failure modes, or service one or more customer preferences.

In some embodiments, the processors are configured to update the one or more adjustable paths when a new order is received or an existing order is modified. In some embodiments, the processors are configured to update the one or more adjustable paths when one or more additional receiving units are deployed to fulfill a new order.

In some embodiments, the processors are configured to update the one or more adjustable paths by changing an order or a sequence in which one or more of the receiving units travel to one or more of the plurality of storage units to retrieve items for an order. In some embodiments, the processors are configured to update the one or more adjustable paths by changing an order or a sequence in which one or more of the receiving units retrieve the one or more items for an order.

In some embodiments, the optimization algorithm is configured to determine an optimal path routing for at least a subset of the plurality of receiving units. In some embodiments, the optimization algorithm is further configured to perform a global optimization for the plurality of receiving units to resolve one or more conflicts with no optimized local solution. In some embodiments, the optimization algorithm is further configured to assign a set of nodes for one or more receiving units to cover at a time, wherein the nodes are selectively reserved so that no other receiving unit can use the nodes until the nodes have been unreserved. In some embodiments, the optimization algorithm is further configured to anticipate collisions and supplement one or more human-designed nodes with one or more additional virtual nodes to enable finer-grained node reservations which allow one or more smaller receiving units to fill a space between one or more larger receiving units. In some embodiments, the optimization algorithm is further configured to perform a graph search with custom heuristics that penalize occupied nodes or movements that take additional time. In some embodiments, the optimization algorithm is further configured to penalize different types of nodes, wherein the different types of nodes comprise an edge node or a fast lane node. In some embodiments, the optimization algorithm is configured to account for a constantly changing map and to recalculate the optimal path routing for the plurality of receiving units when the receiving units are stuck in traffic for a predetermined amount of time or if one or more receiving units are deadlocked with another receiving unit that is trying to cover a same node. In some embodiments, the optimization algorithm is configured to generate or update a path network comprising different types of paths and queueing locations such that the one or more receiving units can only take a subset of the paths based on their destinations. In some embodiments, the optimization algorithm is configured to determine a dispense sequence for the one or items. In some embodiments, the optimization algorithm is configured to compute a cost value for each item based on a mass of the item, a drop surface area, an age or an expiration date of the item, or a packaging material of the item. In some embodiments, the optimization algorithm is configured to assign a higher cost value to objects with a larger mass over a drop surface area. In some embodiments, the optimization algorithm is configured to assign a higher cost value to objects with harder packing material using a multiplicative factor. In some embodiments, the optimization algorithm is configured to determine an optimal drop order based on the cost value associated with each item. In some embodiments, the optimization algorithm is configured to direct a robot to travel to a second storage unit to retrieve one or more items for a customer order if a difference between a drop cost value of a first item and a second item at a first storage unit is greater than a difference between a drop cost value of the first or second item and a third item at the second storage unit. In some embodiments, the optimization algorithm is further configured to determine an optimal location for inventory storage of the one or more items.

In some embodiments, the one or more processors are configured to distribute a plurality of items to a plurality of different storage units to increase a tolerance of individual machine failure. In some embodiments, the plurality of items comprise a same item. In some embodiments, the one or more processors are configured to place more frequently picked items in one or more trays located (i) at or near a dispense mechanism or (ii) in a region that is directly accessible by a dispense mechanism of a robot or a receiving unit to reduce an amount of time needed to retrieve or dispense the items. In some embodiments, the one or more processors are configured to place items that are frequently purchased together within a same tray, to reduce a number of trays that need to be retrieved for order fulfillment.

In some embodiments, the optimization algorithm is configured to determine an optimal item location when picking a path and a dispense order. In some embodiments, the optimization algorithm is configured to implement a weighted cost optimization based on at least one of (i) a travel time to the dispense location, (ii) how busy a dispense location is, and (iii) a relative order in which one or more items should be dropped to minimize item damage during a dispense routine. In some embodiments, the optimization algorithm is configured to weigh one or more costs together to determine a final cost for each item. In some embodiments, the optimization algorithm is configured to determine an item pick order based on potential state changes corresponding to machine failure, unavailability of items, or traffic build up in an area proximate to one or more storage units. In some embodiments, the optimization algorithm is configured to direct one or more robots to an order drop-off location if no unpacked items remain for a customer order.

In some embodiments, the optimization algorithm comprises a cost function. In some embodiments, the optimization algorithm is configured to (i) calculate a weighted cost value for each available tray, (ii) select a lowest cost value destination, (iii) select one or more items from the lowest cost value destination, and (iv) direct one or more robots to retrieve the one or more items from one or more trays associated with the lowest cost value destination, if unpacked items remain for a particular order. In some embodiments, the optimization algorithm is trained using machine learning or reinforcement learning to learn one or more weighted cost values for each cost feature. In some embodiments, the optimization algorithm is implemented using one or more predetermined rules for handling the one or more items. In some embodiments, the one or more predetermined rules are set based at least in part on an editable set of features or tags that are assigned to one or more items when the one or more items are received or inducted. In some embodiments, the editable set of features or tags comprise a designation of drip risk, unpackaged, chemical, food, non-food, type of food, or type of non-food. In some embodiments, the one or more predetermined rules are set based on an editable set of rule operators corresponding to one or more decisions associated with order fulfillment. In some embodiments, the one or more decisions comprise a determination of whether an item can be stored above another item, or whether an item can be packed in a bag with another item. In some embodiments, the one or more predetermined rules are set based on a set of editable rule statements that combine one or more features and one or more rule operators. In some embodiments, the one or more predetermined rules are adjustable to constrain product handling decisions. In some embodiments, the optimization algorithm comprises a machine learning algorithm that is configured to generate one or more feature classifications from one or more images of one or more newly received or inducted items to facilitate onboarding.

In some embodiments, the system further comprises a plurality of robots comprising a movable mechanism for (i) retrieving the one or more items from the plurality of storage units and/or (ii) dispensing the one or more items to one or more of the plurality of receiving units.

In some embodiments, modifying or updating the operation of the automated fulfillment system comprises modifying or updating (i) one or more item storage locations, (ii) a storage location for one or more items within a tray or a storage unit, (iii) a storage location for one or more trays within a storage unit, (iv) a number of items stored in each tray, (v) a number of trays stored in each storage unit, (vi) a distribution of the one or more items across one or more trays, (vii) a distribution of the one or more items across one or more storage units, or (viii) a distribution of the one or more trays across the one or more storage units. In some embodiments, modifying or updating the operation of the automated fulfillment system comprises grouping or co-locating items within the same tray or within the same storage unit. In some embodiments, modifying or updating the operation of the automated fulfillment system comprises grouping or co-locating items such that the items are stored in one or more neighboring trays or storage units that are adjacent to or proximal to each other. In some embodiments, modifying or updating the operation of the automated fulfillment system comprises modifying or updating an availability of a storage unit or a receiving unit based on one or more equipment malfunctions or maintenance needs associated with the storage unit or the receiving unit. In some embodiments, modifying or updating the operation of the automated fulfillment system further comprises rerouting orders to different storage units. In some embodiments, modifying or updating the operation of the automated fulfillment system further comprises dispatching at least one other receiving unit and adjusting the movement paths for the plurality of receiving units based on a planned or actual movement path of the at least one other receiving unit.

In another aspect, the present disclosure provides a system comprising: a plurality of storage units for storing one or more trays comprising one or more items; one or more dispense conveyors for lifting and dispensing at least one of the one or more items into one or more receiving units; and a shuttle comprising one or more tray retrieval mechanisms, wherein the shuttle is movable relative to the plurality of storage units and configured to (a) pick at least one tray of the one or more trays using the one or more tray retrieval mechanisms and (b) transport the at least one tray between a first location and a second location. In some embodiments, the first location or the second location comprises (i) the one or more receiving units, (ii) the one or more dispense conveyors, (iii) one or more storage units of the plurality of storage units, (iv) one or more aisles between the storage units, (v) an induction area for receiving the one or more items, (vi) an item washing area, (vii) an item inspection area, or (viii) one or more vehicles usable to transport the one or more items to or from the product handling system.

In some embodiments, the one or more dispense conveyors are located at or near at least one of the first location and the second location. In some embodiments, the shuttle is movable relative to the one or more dispense conveyors. In some embodiments, the one or more dispense conveyors are movable relative to the plurality of storage units. In some embodiments, the one or more retrieval mechanisms and the one or more dispense conveyors are movable relative to each other. In some embodiments, the one or more receiving units are provided adjacent to or proximal to the shuttle. In some embodiments, the one or more dispense conveyors are provided adjacent to or proximal to the shuttle. In some embodiments, the one or more dispense conveyors are located remote from the shuttle. In some embodiments, the one or more receiving units are located remote from the shuttle.

In some embodiments, the system further comprises an elevator configured to transport the one or more receiving units. In some embodiments, the elevator is configured to transport the one or more receiving units in a vertical direction. In some embodiments, the shuttle is configured to move in a lateral direction. In some embodiments, the shuttle is configured to pick and transport the at least one tray to the elevator. In some embodiments, the elevator is configured to transport the at least one tray in to or towards the one or more dispense conveyors. In some embodiments, the shuttle is configured to pick and transport the at least one tray in a vertical or horizontal direction to or towards the one or more dispense conveyors. In some embodiments, the shuttle is configured to pick and transport the at least one tray along any one or more axes in three-dimensional space. In some embodiments, the shuttle is configured to rotate around any one or more axes in three-dimensional space.

In some embodiments, the one or more dispense conveyors are located under one or more shelves of the plurality of storage units. In some embodiments, the one or more dispense conveyors are located adjacent to the plurality of storage units. In some embodiments, the one or more dispense conveyors are located at or near a center of an aisle between two or more storage units of the plurality of storage units. In some embodiments, the one or more dispense conveyors are located under one or more storage units of the plurality of storage units. In some embodiments, the one or more dispense conveyors comprise a first set of dispense conveyors provided on or coupled to the shuttle and a second set of dispense conveyors under or adjacent to the plurality of storage units. In some embodiments, the one or more receiving units are configured to move relative to the plurality of storage units. In some embodiments, the one or more dispense conveyors are located remote from the plurality of storage units.

In some embodiments, the plurality of storage units comprises one or more shelves. In some embodiments, the shuttle is configured to transfer the one or more shelves to a dispense unit comprising the one or more dispense conveyors. In some embodiments, the dispense unit is configured to (i) pick at least one tray from the one or more shelves and (ii) dispense one or more items from the at least one tray to the one or more receiving units. In some embodiments, the one or more trays comprise one or more openings. In some embodiments, the one or more dispense conveyors are configured to move through the one or more openings to lift and transport at least one item from the one or more trays to the one or more receiving units. In some embodiments, the one or more dispense conveyors comprise one or more features configured to support at least a portion of the one or more items to prevent the one or more items from moving or dropping while the one or more items are being transported.

In some embodiments, the shuttle is configured to move in at least one of a horizontal direction and a vertical direction. In some embodiments, the shuttle is configured to move along one or more lateral planes. In some embodiments, the one or more lateral planes comprise two or more lateral planes corresponding to different heights. In some embodiments, the shuttle is configured to move along one or more axes of movement relative to the plurality of storage units.

In some embodiments, the system further comprises a shuttle movement mechanism. In some embodiments, the shuttle movement mechanism is configured to provide one or more axes of movement for the shuttle to move or travel along.

In some embodiments, the one or more trays comprise one or more openings. In some embodiments, the one or more dispense conveyors are configured to move through the one or more openings to lift and transport at least one item from the one or more trays to the one or more receiving units.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
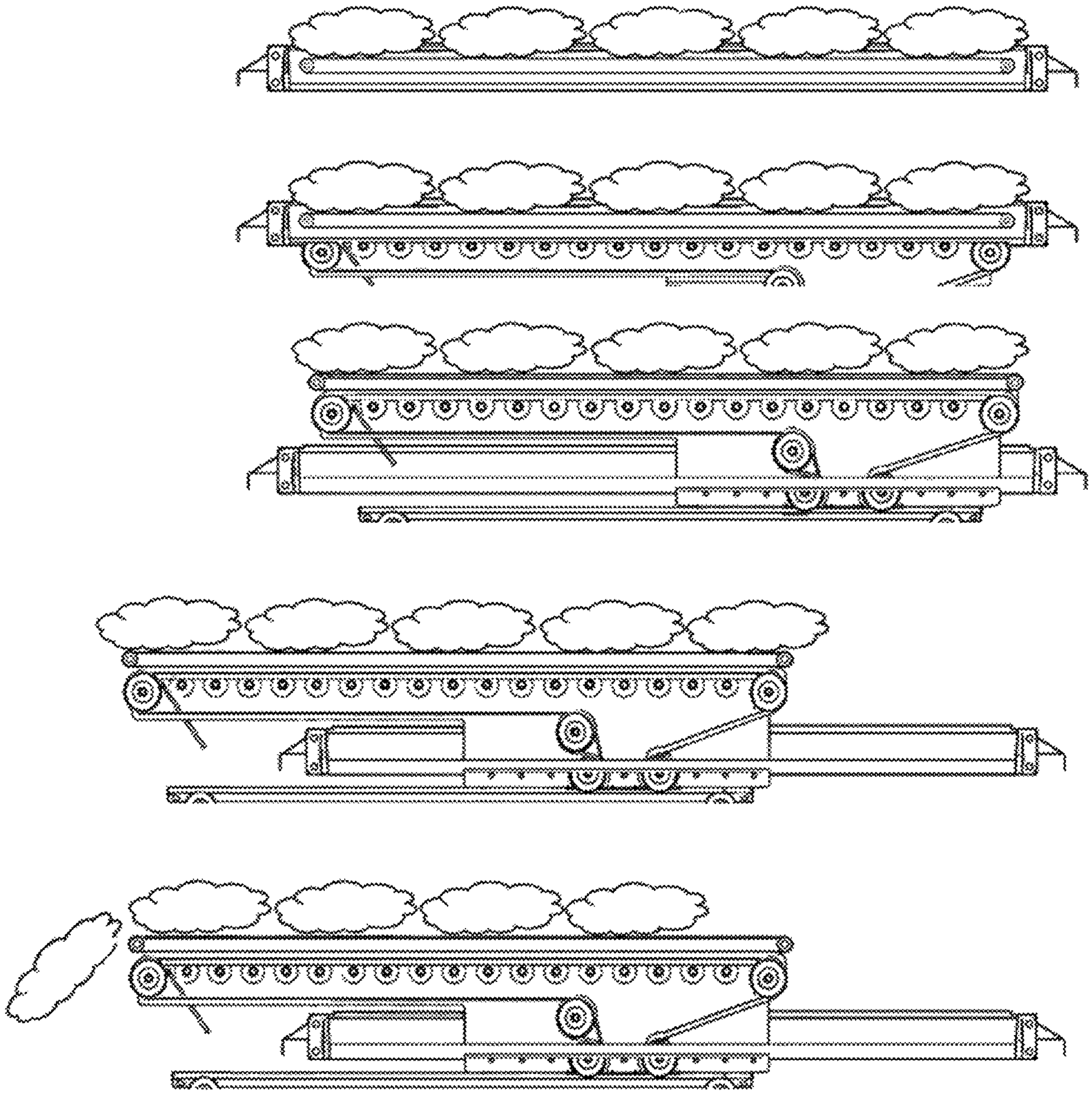
FIG. 1 schematically illustrates a floating conveyor, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

The present disclosure provides systems and methods for removing one or more items from a tray and transporting or dispensing the one or more items into a bag or a box that may be shipped to a consumer or a customer. As used herein, a customer may refer to an end consumer or an entity that buys and sells various items to end consumers or other entities (e.g., grocery stores).

A shuttle system may comprise a type of automated fulfilment technology within a family of technologies relating to automated storage and retrieval systems (AS/RS). In general, there are two main ways these technologies can be used. One is to store and retrieve full cases or boxes that get palletized or sent to the shipped dock in some way. Another is to store and retrieve totes full of individual items that get picked one at a time. Typically, this is for an e-commerce application or a spare parts application. In this latter case, the tote may typically get sent to a picker to pick the item. Usually the picker is a human, but it may be a pick and place robot.

In some instances, a shuttle (picker) may be configured to travel on each level of a storage unit and to pick a tote. The tote may be brought to the end where there is an elevator (z) that brings the tote to ground level. The tote may then be moved by conveyors to a human or a pick and place robot. In some cases, a robot may collect the tote from the elevator and move it to an item picker. This can reduce the complexities of the conveyors. In other cases, instead of a lift, the shuttle may pick the tote and bring it to the picker. The shuttle may be configured to travel vertically to perform this operation. Various examples of AS/RS systems may be used.

Integrated Dispense

In an aspect, the present disclosure provides a product handling system with integrated dispense features and capabilities. The product handling system may comprise: a plurality of storage units for storing one or more trays comprising one or more items; one or more dispense conveyors for lifting and dispensing at least one of the one or more items into one or more receiving units; and a shuttle comprising one or more tray retrieval mechanisms, wherein the shuttle is (a) movable relative to the plurality of storage units and (b) configured to (i) pick at least one tray of the one or more trays using the one or more tray retrieval mechanisms and (ii) transport the at least one tray to the one or more dispense conveyors.

The plurality of storage units may comprise one or more shelves for storing for storing trays and/or items. The plurality of storage units may comprise, for example, a vertical lift system (VLS). The VLS may comprise a lift, a platform, a support, or a carrier that may travel laterally (e.g., vertically and/or horizontally) to access one or more shelves, trays, and/or items. In some cases, the plurality of storage units may comprise a lift, a platform, a support, or a carrier that may travel along any axis or plane in three-dimensional space to access the one or more shelves, trays, and/or items. In some cases, the one or more shelves may comprise one or more fixed platforms or supports. In other cases, the one or more shelves may be movable using a carousel mechanism. The carousel mechanism may be configured to move the one or more shelves along a closed loop internal path within the storage unit such that the one or more shelves sequentially arrive at a target region within the storage unit. The target region may be aligned with one or more openings in the storage unit. The target region may be used for item induction through the one or more openings. In some cases, the target region may be used for removal of one or more trays or items so that one or more items stored in the trays or on the shelves of the storage unit may be transported to a receiving unit for dispensing into or onto the receiving unit. The receiving unit may comprise a box, a bag, or a container configured to receive one or more items. In some cases, the receiving unit may comprise a platform or a support on which one or more items may be placed. The receiving unit may be referred to interchangeably as a Line Following Bag (LFB). The receiving unit or LFB may comprise a robot, a platform, or a support configured to receive one or more items. In some cases, the LFB may comprise a robot with a support configured to receive the one or more items. In some cases, the LFB may comprise a robot with a bag or a box configured to receive the one or more items. The bag or box may be flexible or rigid. The bag or box may or may not be collapsible. In some examples, the LFB may comprise a robot with a collapsible bag on top (e.g., for receiving one or more items), or a surface on which the one or more items may be placed.

The one or more dispense conveyors may be used to lift one or more items from a tray once the tray is positioned at or near the target region. The one or more dispense conveyors may be configured to move below the tray along one or more axes or planes to align with different regions of the tray. In some cases, the tray may comprise a plurality of grooves containing the one or more items. The grooves may have one or more openings or slots on a bottom portion of the grooves. In some cases, the dispense conveyors may be configured to move along the one or more axes or planes underneath the tray to align with one or more openings or slots of the grooves that contain one or more items of interest (e.g., one or more items associated with a customer order). Once aligned with a particular opening or slot, the dispense conveyors may be configured to move vertically relative to the tray to extend through the slot and lift the one or more items from the tray. In some cases, the tray may be configured to move vertically relative to the dispense conveyors such that the dispense conveyors extend through the opening or slot and lift the one or more items from the tray. Once the one or more items are lifted by the dispense conveyors, the dispense conveyors may be configured to transport the one or more items towards a receiving unit or a carrier. The carrier may comprise a robot that is movable in a plurality of different directions to access a plurality of different trays stored in the one or more storage units. The storage units may comprise, in some non-limiting examples, a VLS as described elsewhere herein. The carrier may be configured to receive or support one or more items that are picked from the tray using the dispense conveyors. In some cases, the carrier may comprise the receiving unit. In other cases, the receiving unit may be integrated with the carrier. In some cases, the carrier may be configured to transport the one or more items to the receiving unit, which may be located remote from the carrier. In some embodiments, at least a portion of the dispense conveyors may be configured to translate or extend to or towards the carrier or the receiving unit. In some embodiments, a movable portion of the dispense conveyors may be used to transport or convey the one or more items to or towards the carrier or the receiving unit to dispense the one or more items into or onto the carrier or receiving unit. The movable portion may comprise, for example, one or more conveyor belts or one or more chains.

In some embodiments, the system may comprise a shuttle. The shuttle may comprise the carrier described above. Alternatively, the shuttle may be a mechanism or sub-system that is distinct from the carrier described above. The shuttle may comprise a robot that is configured to move relative to the plurality of storage units to access one or more trays stored in the plurality of storage units. In some cases, the shuttle may comprise one or more tray retrieval mechanisms. In some cases, the shuttle may be configured to move in at least one of a horizontal direction and a vertical direction. In some cases, the shuttle may be configured to move along one or more lateral planes. The one or more lateral planes may comprise two or more lateral planes corresponding to different heights. In some cases, the shuttle may be configured to move along one or more axes of movement relative to the plurality of storage units. In some embodiments, the system may further comprise a shuttle movement mechanism. The shuttle movement mechanism may be configured to provide one or more axes of movement for the shuttle to move or travel along. The shuttle movement mechanism may comprise, for example, a gantry-like system. The shuttle may be configured to (i) pick at least one tray of the one or more trays using the one or more tray retrieval mechanisms and (ii) transport the at least one tray to the one or more dispense conveyors. The one or more tray retrieval mechanisms may comprise an extendible arm, member, or frame that is configured to move towards and/or away from one or more trays. The one or more tray retrieval mechanisms may comprise a hook or a latch to engage with a portion of the one or more trays. The hook or latch may enable to tray retrieval mechanism to move or pull the one or more trays out so that the dispense conveyors can access the trays and the items stored in the trays. In some cases, the shuttle may be movable relative to the one or more dispense conveyors. The one or more tray retrieval mechanisms and the one or more dispense conveyors may be movable relative to each other. In some cases, the shuttle may be configured to move in one or more lateral directions.

In some cases, the shuttle may be configured to pick and transport at least one tray to an elevator. The elevator may be configured to transport the at least one tray to one or more dispense conveyors. In other cases, the shuttle may be configured to pick and transport the at least one tray in a vertical or horizontal direction to or towards the one or more dispense conveyors.

In some cases, the one or more receiving units may be provided adjacent to or proximal to the shuttle. In some cases, the one or more dispense conveyors may be provided adjacent to or proximal to the shuttle. In some cases, the one or more dispense conveyors may be located remote from the shuttle. In some cases, the one or more receiving units may be located remote from the shuttle. In some embodiments, the one or more receiving units may be configured to move relative to the plurality of storage units.

In some embodiments, the system may further comprise an elevator configured to transport the one or more receiving units. The elevator may be configured to transport the one or more receiving units in a horizontal and/or vertical direction.

In some cases, the one or more dispense conveyors may be located under one or more shelves of the plurality of storage units. In some cases, the one or more dispense conveyors may be located adjacent to the plurality of storage units. In some cases, the one or more dispense conveyors may be located remote from the plurality of storage units.

As described above, the plurality of storage units may comprise one or more shelves. The shuttle may be configured to transfer the one or more shelves to a dispense unit comprising the one or more dispense conveyors. The dispense unit may be configured to (i) pick at least one tray from the one or more shelves and (ii) dispense one or more items from the at least one tray to the one or more receiving units. In some cases, the one or more trays may comprise one or more openings. In such cases, the one or more dispense conveyors may be configured to move through the one or more openings to lift and transport at least one item from the one or more trays to the one or more receiving units. In some embodiments, the one or more dispense conveyors may comprise one or more features configured to support at least a portion of the one or more items to prevent the one or more items from moving or dropping while the one or more items are being transported. The one or more features may comprise, for example, one or more beads or other physical components that support one or more sides of the items as the items are being transported. In some cases, the one or more features may comprise various protrusions and/or depressions. Such protrusions and/or depressions may be spaced apart in a periodic or aperiodic configuration.

In some embodiments, the dispense conveyors may be integrated inside the shuttle with the customer receptacle attached to the shuttle. When filling an order, the shuttle travels to each location, pulls out the tray, dispenses an item, replaces the tray and then moves to the next try location. This repeats until the bag is full. Then the shuttle travels somewhere to remove the customer receptacle.

In other embodiments, the picking and dispensing may be performed on the shuttle, but the receptacle may be on a separate robot underneath (e.g., on the ground). When a tray gets picked, the shuttle travels to the ground to dispense the item into the receptacle.

In some instances, the shuttle works the same way as described above but does not travel vertically. Instead of traveling down to the ground to dispense, it travels horizontally to the ends where the receptacle is on an elevator that goes to each level.

In other instances, the shuttle does not travel in z and stays on one level. It transfers a tray onto an elevator, which bring it to the ground. Once the elevator gets to the ground, it would go over a dispense conveyor that would dispense it into the receptacle.

In some cases, the dispense may be at the end of the row on the ground. But, instead of an elevator bringing the tray to it, the shuttle may move vertically and horizontally to transport a tray to dispense.

In other cases, the dispense may be provided under the shelves instead of under the shuttle aisle. The shuttle drops a tray off above the dispense and the dispense moves up through the tray to dispense an item out. The dispense may be on one side or both.

In some embodiments, the one or more dispenses may be located under the shelving and the shuttle aisle is also an aisle for the receptacle to travel around. One variation may enable the receptacles to travel through the shelving at the ground level in order to get quick access to each dispense conveyor.

In other embodiments, the dispense conveyors may not be co-located with the storage. In such cases, the shuttles may pick one or more trays and transport them to one or more dispense units.

Cube Storage with Dispense Conveyor

Another AS/RS technology is cube storage. When fitting a dispense conveyor into this architecture, the best place is around the exterior of the system. One or more picker bots (red) may travel around and lift trays out of each storage column. The picker bots may move the trays to the dispense cells (blue) and lower them over the dispenses so that one or more item may be dispensed into a receptacle. Thereafter, the tray may be removed or replaced.

To enable this, the trays would need to be designed more like a tote, but where one or two walls are open. The four corners (red dots) would be the picking location for the picker bot. The product would be conveyed out of the open side of the tote. There may be a variety of tote heights to accommodate different SKU heights while not wasting vertical storage space. The walls may also just be posts on the four corners. The posts/walls may also be automatically removable and/or replaceable to minimize the number of different tray and/or tote configurations needed.

Mini-Load with Dispense Conveyor

In some cases, a dispense station may be provided in line with a mini-load AS/RS configuration. The pick may be on a rail and travel horizontally and/or vertically. The pick may then deposit a tray over a dispense conveyor to pick an item. In some cases, the receptacle may be on the outside of the system so that it does not interfere with the rail of the mini-loader. The receptacle can also be at the end of an aisle with the rail stopping just short of the dispense. In some embodiments, there may be one or more dispenses. The dispenses may be at ground level or on multiple levels.

AGV Storage System with Dispense Conveyor

Another example of an AS/RS configuration may involve one or more automated guided vehicle (AGV) robots configured to lift a shelf and carry the shelf to a picker. The AGV may be configured to move between various locations (e.g., from a first location where a shelf or tray is located to a second location where a picker is located). The AGV can comprise a support surface on which trays containing various items and products can be placed or held for transport to different regions in a warehouse, a grocery store, or an item storage, handling, packing, and distribution center. The support surface may comprise a horizontal support surface that is located on an upper portion of the AGV. The support surface may be integrated with one or more structural components of the AGV. In some cases, the AGV may also be configured to hold or support a tray or a container (e.g., a box or a bag) in which a plurality of items and products can be placed or held. In some cases, the container may be optional (i.e., the trays and/or the items and products stored in the trays can be placed directly on a support surface of the AGV). Trays, items, and/or products may rest on a supporting structure or surface of the AGV.

In some embodiments, the architecture described above can also be integrated with a dispense station. Shelves may be lifted up and carried to the front by a line following tray (LFT). The LFT may comprise a robot that is configured to carry one or more trays. In some cases, the LFT may comprise a floor traveling AGV. The shelf may be docked with a dispense station and a tray may be pulled out from the shelf in order to pick an item from it. The dispense may have a small elevator to pick from anywhere in the rack. Afterwards, an item may be dispensed, and the tray and rack may be returned to storage.

Freezer with Ante Room Underneath

One of the main challenges when designing a freezer is that condensation can cause frost or ice to build up and cause problems, which can be especially bad in an automation setting. A vertical lift machine may comprise an ante room that can help to reduce ice buildup. The vertical lift machine may comprise a plurality of storage areas 710 and one or more elevators 715 for transporting items between the storage areas 710 and the one or more dispense units 720. Insulation may be used to separate different zones or regions of the vertical lift machine. One or more doors may be provided to allow the elevators 715 to move between the different zones or regions. The different zones or regions may have different storage conditions (e.g., different temperatures, pressures, humidities, etc.) The storage systems can reduce the buildup of condensation in the low temperature (LT) areas by creating an ante room that is kept at a refrigeration temperature (RT). The RT area may have lower humidity because it is cold and that may reduce the humidity that enters the LFT when the doors are opened. As used herein, the terms "LT" or "low temperature" may refer to or may correspond to a freezer temperature. The low temperature or freezer temperature may comprise a range of temperatures for storing one or more items that may need to be frozen to maintain freshness, quality, or shelf life. In some cases, the range of temperatures for the LT areas may be from about −20 degrees Celsius to about 0 degrees Celsius. As used herein, the terms "RT" or "refrigeration temperature" may refer to or may correspond to a range of temperatures for storing one or more items that may need to be refrigerated to maintain freshness, quality, or shelf life. In some cases, the range of temperatures for the RT areas may be from about 0 degrees Celsius to about 5 degrees Celsius.

In some cases, a VLS pack may be placed in an insulated room comprising modular walk-in panels or other insulating structures. In some cases, the freezer may comprise a horizontal or other door mechanism. The door mechanism may normally be closed, and may separate the RT and LT regions. In some cases, the dispense area may be located in RT. In some cases, a single or dual layer air curtain may be provided for one or more LFBs and/or LFTs to enter. In some cases the freezer may be on top of a refrigerated storage area. In an alternative embodiment for a VLS Pack-Ante Room, the system may comprise a freezer with an RT ante room and a vertical door.

Tetra VLS Configuration

In an alternative vertical lift system configuration, trays can be picked from multiple sides and brought down to dispense. The vertical lift system may comprise a plurality of storage areas 710 located adjacent to one or more vertical lift elevator shafts 711. The plurality of storage areas 710 may be accessible from a plurality of different sides via the one or more vertical lift elevator shafts 711. One or more elevators 715 may travel vertically up and down the vertical lift elevator shafts 711 to retrieve items from the plurality of storage areas 710. The one or more elevators 715 may be capable of retrieving items from a plurality of different storage areas 710 located on different sides of the vertical lift elevator shaft 711. In some cases, the trays may be picked from one or more directions. For example, a tray may be picked from a first direction using a carrier located in a first vertical lift elevator shaft, or from a second direction using a carrier located in a second vertical lift elevator shaft. In any of the embodiments described herein, one or more LFBs may be configured to travel underneath the vertical system to receive one or more items dispensed from the vertical lift system.

Tetra VLS—LFR Navigation

In some cases, one or more bots may drive underneath to access the one or more dispense stations. In some cases, the tetra VLS configuration may provide for an LFB-only highway and/or an LFT and LFB highway.

Pick Station Design

Floating and Tongue Conveyors

In some cases, the dispense conveyors may have trouble dealing with some categories of SKUs, including floppy items (tortillas) and leafy items (bunch of carrots or kale). The fundamental problem is that these things cannot be picked up by 2 lines of pulleys on belts. They need a fully supported surface underneath. But, in order to have the fully flat surface lift them out of the tray, the flat belt would need to travel through the support structure on the tray. One solution is to have a flat surface in the tray that can be lifted with an item on it and then conveyed into the bag/box. Such a solution can be implemented using floating conveyors and/or tongue conveyors. The floating conveyors and/or tongue conveyors may comprise any type of support, apparatus, or device that can be used to transport, deliver, move, or convey items from a first location to a second location. As used herein, a "floating conveyor" may refer to a support on which one or more items may rest. The support may be liftable from a tray. The support may comprise a conveyor that may be used to convey the one or more items towards a support or a receiving unit. The conveyor may be driven by another conveyance unit (e.g., one or more dispense conveyors are described elsewhere herein). In some cases, the one or more dispense conveyors may lift the support from the tray so that the support is "floating" relative to the tray. In some cases, the one or more dispense conveyors may couple to the support so that the conveyors of the dispense conveyors can be used to drive or operate the conveyor of the support. The one or more dispense conveyors may be operated or driven in a first direction to drive the conveyor of the support (e.g., in a second direction). As used herein, a "tongue conveyor" may refer to a support on which one or more items may rest. The support may comprise a flexible material on which one or more items may be placed. The support and the one or more items provided on the support may be simultaneously conveyed towards a receiving unit. In some cases, the support may be configured to extend around or along a bottom portion of the one or more dispensing arms when conveyed to or towards a receiving unit. In other cases, the support may be configured to hang off an end of the one or more dispensing arms (like a tongue) when conveyed to or towards a receiving unit.

In an aspect, the present disclosure provides a product handling system comprising: a tray comprising one or more lanes and one or more openings disposed on a bottom surface of the tray; one or more supports positioned within at least one of the one or more lanes, wherein the one or more supports are configured to support one or more items; and one or more dispensing units comprising one or more dispensing arms, wherein the one or more dispensing arms are configured to (i) couple to or engage with a portion of the one or more supports and (ii) transport the one or more supports and the one or more items on the one or more supports to one or more receiving units.

In some cases, the one or more supports may be liftable, removable, and/or movable relative to the tray. The one or more supports may be lifted and/or moved using one or more dispense conveyors. The one or more dispense conveyors may comprise one or more dispensing arms comprising a movable mechanism for transporting or conveying one or more items to a receiving unit. The movable mechanism may comprise, for example, one or more conveyor belts or chains. In some embodiments, the one or more dispensing arms may be configured to move through the one or more openings to lift the one or more supports and the one or more items on the one or more supports and (ii) transport the one or more supports and the one or more items to one or more receiving units.

In some embodiments, the one or more supports may be configured to support the one or more items as the one or more items are transported to the one or more receiving units. The one or more dispense conveyors may be configured to lift the one or more supports while the one or more items rest on the one or more supports. Lifting the one or more supports may also result in a simultaneous lifting of the one or more items on the one or more supports. The one or more dispense conveyors may be configured to simultaneously transport the one or more items and the one or more supports to or towards the one or more receiving units by (i) extending a top portion of the one or more dispense conveyors to or towards the receiving units and (ii) conveying the one or more items into or onto the receiving units.

In some embodiments, the one or more dispensing conveyors may have one or more conveyor belts, and the one or more supports may have one or more secondary conveyor belts. The one or more conveyors belts of the dispensing units may be configured to move in a first direction, thereby causing the one or more secondary conveyor belts of the one or more supports to move in a second direction to transport the one or more items towards the one or more receiving units for dispensing. The movement of the conveyor belts of the dispensing conveyors in a first direction (e.g., clockwise or counter-clockwise) may cause the secondary conveyor belts of the one or more supports to move in a second direction (e.g., counter-clockwise or clockwise), which may cause the one or more items resting on the supports to be conveyed towards the one or more receiving units. In some cases, the second direction may be different than the first direction. In other cases, the second direction may be the same as the first direction.

In some cases, the one or more supports may comprise an alignment feature that is configured to couple the one or more supports to the one or more dispensing arms. The alignment feature allows the one or more supports to mate with or couple to the dispense arms. Once coupled, the one or more supports may move with the one or more dispensing arms as a single unit. Further, the conveyors of the dispense arms and the secondary conveyors of the supports may be placed in contact with one another such that a movement of conveyors causes a reactionary movement of the secondary conveyors in a different or opposite direction. For example, if a top portion of the one or more dispensing arms extends or advances towards the one or more receiving units, the one or more supports (and the one or more items resting on the supports) may also advance towards the one or more receiving units by a same distance. Once in an extended position, the conveyors of the dispensing arms may move in a first direction, which causes the secondary conveyors in contact with the conveyors of the dispensing arms to move in a second direction that is different than the first direction.

In some embodiments, the one or more supports may comprise a flexible element that is configured to support the one or more items. The flexible element may operate as a tongue (i.e., the flexible element may be configured to extend off an end of the dispensing arm or around a bottom portion of the dispensing arm when conveyed towards a receiving unit). The flexible element may comprise a belt that is configured to extend around or along a portion of the one or more dispensing arms. In some embodiments, the system may further comprise a rolling element configured to direct at least a portion of the flexible element in a predetermined direction (e.g., downwards or out of the way of the dispensing arms as one or more items are being dispensed) as the flexible element moves relative to the one or more dispensing arms. In some cases, the rolling element may be integrated with the one or more receiving units. In such cases, the one or more receiving units may be configured to position the rolling element adjacent or proximate to the one or more dispensing arms to permit a controlled routing of the flexible element in a desired direction.

In some cases, the system may further comprise an engagement mechanism configured to couple the flexible element to a portion of the one or more dispensing units. The engagement mechanism may comprise, for example, a latch or a hook. In some cases, the engagement mechanism may comprise a pin that is configured to extend into and/or engage with a portion or component of the one or more dispensing units.

In some cases, the one or more dispensing arms may comprise a bead chain or a slotted chain link. This can help to reduce a movement of the one or more items and improve a stability of the one or more items as the items are conveyed to or towards a receiving unit.

In some cases, the flexible element may comprise one or more features to prevent the one or more items from rolling, moving or dropping while the one or more items are being transported. The one or more features may comprise, for example, various anti-rolling features such as grooves, bumps, or protrusions. The features may have a spacing that is periodic or aperiodic to accommodate different item sizes, shapes, and profiles.

Floating Conveyor

As shown in FIG. 1, the floating conveyor may comprise a conveyor that sits in each tray lane. The conveyor may not or need not comprise an actuator. The dispense conveyor can be configured to pop through the tray and lift the floating conveyor up. Notches on the back of the floating conveyor may lock to the dispense arm of the dispense conveyor. The dispense conveyor may start moving its belts backwards, which may, in turn, rotate the belt of the floating conveyor forward until one or more items fall off the front of the floating conveyor into a bag/box or onto a support. The items may be completely supported on a flat belt surface of the floating conveyor as the items are conveyed towards the bag/box or support for dispensing.

An alignment block may be used to allow for various amounts of misalignment when lifting the floating conveyor out of the tray. After the conveyor is lifted, the block can rigidly couple the conveyor to the dispense arm so that the flat conveyor belt can be completely controlled. The flat conveyor belt can be moved forward when the dispense belts move backward, and moved backward when the dispense belts move forward.

The floating conveyors may be configured to hang in a simple 4-walled tray frame, allowing a single tray to carry sets of conveyors of various sizes. The location of a conveyor in the tray may be controlled by interfacing with neighboring trays. One design is a single sheet metal base portion with 4 individual side pieces, two of which are capable of sliding in order to accommodate tensioning and the variability in conveyor belt manufacturing. Other designs to reduce part count and assembly steps may include, for example, two frame pieces that slide or pivot into place with an over-center mechanism in order to tension the belt.

A tongue conveyor may be used for item dispensing. The tongue conveyor is similar to the floating conveyor with one major difference. The floating conveyor may comprise a continuous belt that wraps back under the floating conveyor.

The tongue conveyor does not rotate underneath itself, but falls off the edge and hangs down. Or, it may follow the shape of the dispense arms and follow the belt path back around. Once an item is dispensed, the belt may roll back into place before the tray is returned to storage. In some cases, the tongue follows the belt path under the dispense arm. To prevent ellipsoid objects from rolling on a tongue, the tongue may comprise a "V" or "U" shaped cross-section and one or more bumps or protrusions. Alternatively, the tongue may be configured like a ladder with holes along the length of the tongue that create stable points for ellipsoids.

Tongue Conveyor with Front Roller

In some cases the tongue may be diverted by a roller. The roller may be attached to an LFB, or may be a part of the VLS. This can reduce the need for a mating interface between the tongue and the dispense arm.

Tongue Conveyor Engagement

The tongue conveyor may be capable of engaging with the dispense conveyor arms in order to dispense items, and then disengaging with the dispense conveyor arms in order to place the tongue conveyor back in the tray. Various methods of engagement include dropping the front tongue conveyor link onto a rail on the dispense arms. The tongue may then be pushed forward and/or backward using a pushing element on the chain. The tongue can be engaged from two slots at outboard positions on the tongue, or from a single slot at the center of the tongue. In some other alternative embodiments, a pin on the tongue conveyor may be used to engage with a slotted chain link by the dispense arms moving inward and/or outward to slide the slot over the pin. The forward or backward movement of the chain link can then move the tongue as needed.

Conveyors Built into Trays

In some cases, one or more conveyors may be built into or integrated with a structural portion or element of the trays. This may be useful for dispensing floppy and/or irregular items. The one or more conveyors built into or integrated with the trays may comprise a floating conveyor that is built into a tray. This can reduce capex by leveraging the frame of the tray as the structure for the conveyor and further reduce opex by not having to maintain a separate part (e.g., a tongue) that may need to be cleaned and installed in the tray by an operator. In some embodiments, the one or more conveyors built into or integrated with the trays may comprise, for example, a fixed position belt, a fixed tongue in a slotted divider, one or more pop-up rollers for items with no contamination risk, and/or one or more pop-up rollers for items with contamination risk.

Tray Hinge

In some scenarios, handing off items between the tray and conveyors at pop through can be unpredictable. This makes dispensing floppy or unusually shaped items with the current tray/conveyor system more challenging. Reliability may improve by removing this handoff, and not needing to lift items off the tray during dispense.

One way to achieve this is designing a hinge into the front wall of the tray. The wall remains vertical while moving the tray to keep items in place. When ready to dispense, the front wall rotates 90 degrees to create a flat plane with the surface supporting the one or more items. The items can then be pushed/pulled along this flat surface to dispense.

Skid Plate

Floppy items which need to be supported by a flat surface can still be conveyed by conveyor belts and slid on a low friction support surface. In some cases, a flat plate or a "skid plate" with two slots can be installed into trays and floppy items can be placed onto these plates. During the dispense sequence, the plate may be lifted on the dispense arms such that the dispense belts protrude above the plate to contact the floppy items and slide them along the plate and over the front tray edge and into the LFB.

In order to facilitate this process for particularly floppy items, a weighted "shovel" can be installed on the back of the plate (blue). The shovel may be configured to slide along the dispense belts hovering just above the skid plate surface and can help to push floppy items along the skid plate surface. In some cases, the skid plate may comprise an array of slots and the dispense arm may be replaced with corresponding rolling actuators. To dispense items, the tray may be lowered until the dispense wheels protrude above the top surface of the plate. The rotating wheels may be used to dispense items from the tray.

Tongue Spool

In some cases, the dispense arm may need to mate to and un-mate from the tongue during each dispense sequence. Also, the tongue may need to leave the tray in order to dispense items. An alternative design is to have the tongue wound around a pulley in the front of the dispense tray. In order to dispense items, the dispense arm belts touch off on the front pulley, and spin backward, thereby winding up the tongue and dispensing items off the front of the tray.

Trap Door Conveyor

In some cases, the dispense systems and methods disclosed herein may require some sort of acceleration for the items being conveyed, in order to get them off of the tray and into the LFB. In some cases, such acceleration can cause unstable items to move in unpredictable ways and make accurate dispensing more challenging. An alternative design that involves zero acceleration of the unstable items is to have a tray with a front pulley which can slide forward and/or backwards on a slot of the tray. A flat conveyor belt may be wrapped around this front pulley, fixed at the top of the tray, and moveable at the bottom of the tray. In order to dispense items off of this tray, the bottom of the belt may be moved to the left, either by pulling directly on the belt, or winding it around a second, fixed, pulley. This moves the front pulley to the left, pulling out the floor from underneath the item so that it can drop into the LFB.

Fixed Position Belt

In some cases, one or more belts comprising a slider bed may be integrated with and/or coupled to the tray. The one or more belts may not or need not come out of the tray during a dispensing of one or more items. The one or more belts may be provided in a fixed position and/or orientation relative to the tray. In some embodiments, the tray may be moved over the LFB to dispense one or more items. In some cases, there may be a low front member comprising a roller. In some cases, multiple crossmembers may be provided inside the belt. The belt may be driven by direct contact with the dispense arm.

Tongue+Slotted Divider

In a cost-effective way to get a flat conveyor in a tray, tongues may be fed into slots in lane dividers, and may be driven underneath the dividers by a complementary chain on the dispense arm. This design may provide several advantages, including a simplified configuration that does not require any pulleys, bearings, and/or bushings in the tray. The tray divider may be a single part. Further, the tongue may live in the tray, which simplifies interlocking. The configuration can be modified to include a drip pan below tongue, and may be designed with front and/or back symmetry.

Pop-Up Rollers

Figure 2:
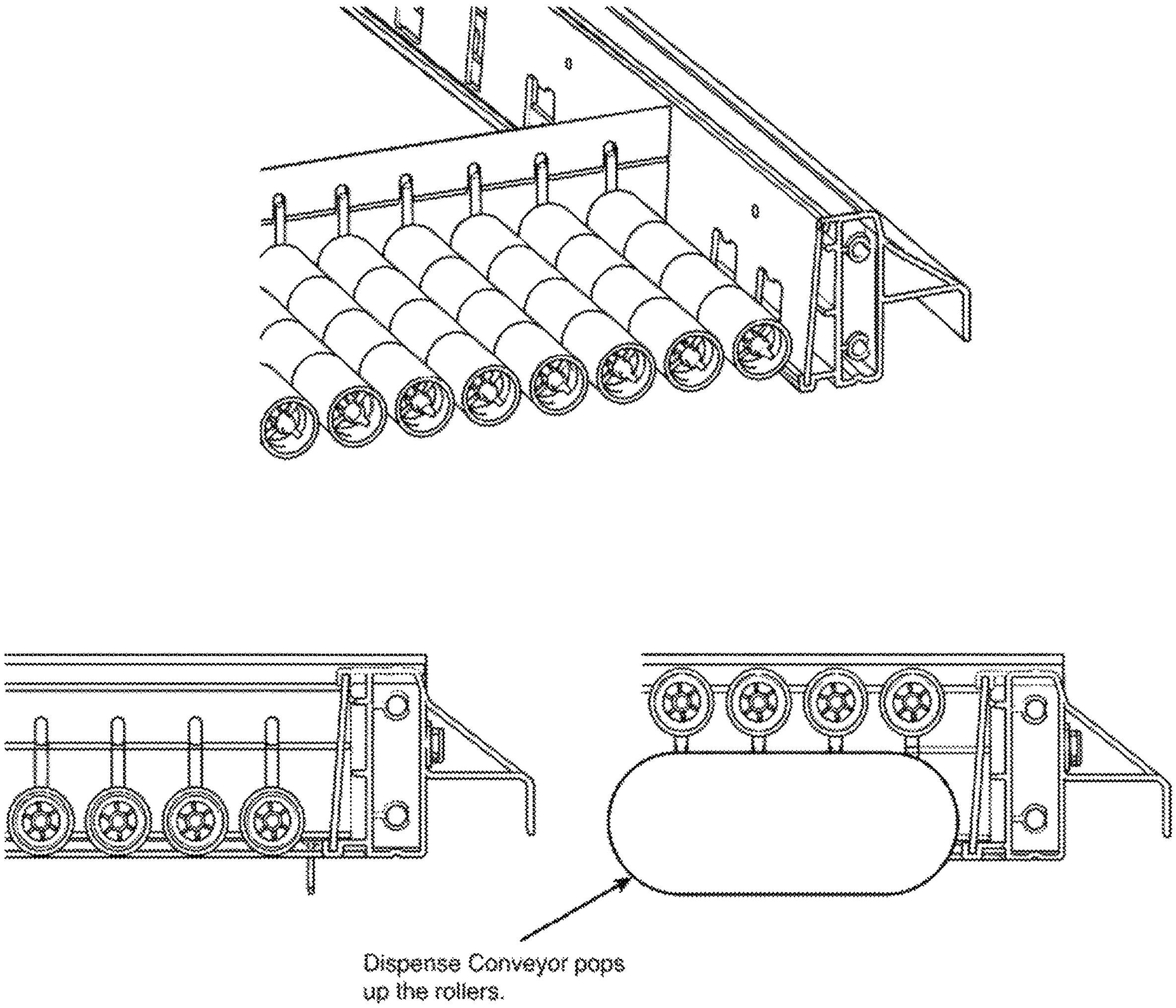
FIG. 2 schematically illustrates one or more pop-up rollers, in accordance with some embodiments.

As shown in FIG. 2, one or more pop-up rollers may be used to convey floppy and irregular items. The pop-up roller may be sized, shaped, and/or arranged to approximate a flat conveyor. In some embodiments, one or more belt conveyors may be used instead of a plurality of rollers. In some embodiments, the tray dividers may have slots that the roller axles sit in. The tray may be extended out of the elevator over the bag by a tray picking mechanism. In some cases, the tray picking mechanism may be built into the elevator. The tray may be lowered over the dispense unit and dispense unit may be used to lift the rollers up in the slots. The dispense belt may be used to run or drive the rollers, driving the one or more items over the edge for dispensing into a bag or onto a support.

Pop-Up Rollers, Driven in the Divider

In some cases the dispense belts may be configured to lift up and drive one or more wheels provided within the dividers. The dispense belts may be positioned such that the dispense belts do not touch the yellow rollers that hold the food items, which reduces the chance of any cross-contamination.

Self-Contained Bucket

A self-contained bucket configuration may comprise a floating conveyor integrated into a bucket that may catch drips from food items. One or more drive axles may protrude from the sides of the bucket and may be engaged by the dispense conveyor. The whole bucket may be lifted out of the tray by the dispense lifting under the drive wheels.

Chain Dispense Concepts

Ellipsoid objects (e.g., an avocado or pear) on dispense belts may roll due to the positive and negative acceleration of the dispense belts, or may lean on one another such that after the front object is dispensed, the second item is unstable and rolls off the edge of the conveyor.

One or more features or "bumps" (shown in red) can be used to provide a hard stop which can prevent items from rolling and/or separate items from one another so they can no longer lean on one another. Some exemplary ways for creating these features on a sliding conveyor line include (i) a piece of thermoplastic with bumps that are connected by a single plastic flexure and include reinforced cords for additional support, or (ii) a chain with central links that include one or more features (e.g., grooves, bumps, protrusions, depressions, etc.). In some embodiments, the chain may be designed to slide on the dispense arm by either sliding in a slot, or gripping the outside of a slot.

Chain Concepts

Several chain designs may be used to reorient the force vector to point through the support arm (resulting in no moment). The chain designs may utilize a lever arm to provide the reaction, which lever arm may be longer than the lever arm that the item sits on.

A link chain may be used in combination with the systems of the present disclosure. The links may wrap around the outer edge of the arm, which brings the force vector closer to pointing through the arm. The length and spacing of the bumps of the chain can be adjusted by inserting links in different combinations. Such a configuration may not require any lubrication, and fewer rollers may be required. The chain may slide on the metal support arm. Such a configuration may be easy to clean by spraying with cleaning solution. The arm and link geometry does not have nooks to capture gunk. The chain may be driven by a custom sprocket that interfaces with extensions of the pivot pins.

In some cases an inverted roller-type chain may be used. The inverted roller-type chain may comprise one or more link plates that are provided at the center of the chain, and one or more pins may extend outward from the chain. The pins may be captured in a channel that the chain rides in.

In some cases, one or more bumpy link plates may be used. This can allow for back bending, and can provide a smoother contiguous contact surface. The bumpy link plates may allow the moment to be transmitted through the pivoting joint to the pins.

In some cases, one or more bumpy pin plates may be used. Such plates may be spaced out further to allow any back bending. The bumpy pin plates may allow the moment to be transmitted through the plates directly to the pins.

A chain configuration can interface with a tongue. The chain may poke through one or more holes in the tongue. The chain may be used to capture the tongue as it travels around the sprocket. On the bottom, the tongue can run in a channel in the arm once the chain has released the tongue.

Chain Dispense "Front Flag"

In some cases, the front radius of the dispense arm may leave a space at the front of the trays for items that fit in the tray, but fall off the dispense on pop-through. One solution is to put a front spacer in the tray which fills this space and effectively shortens the lane. Another solution is to add a "front flag" to the dispense chain. The front flag may comprise a chain link that extends off of the front of the dispense arm to lift objects in this space without compromising storage space.

Chain Dispense Concepts-Bead Chain

Figure 3:
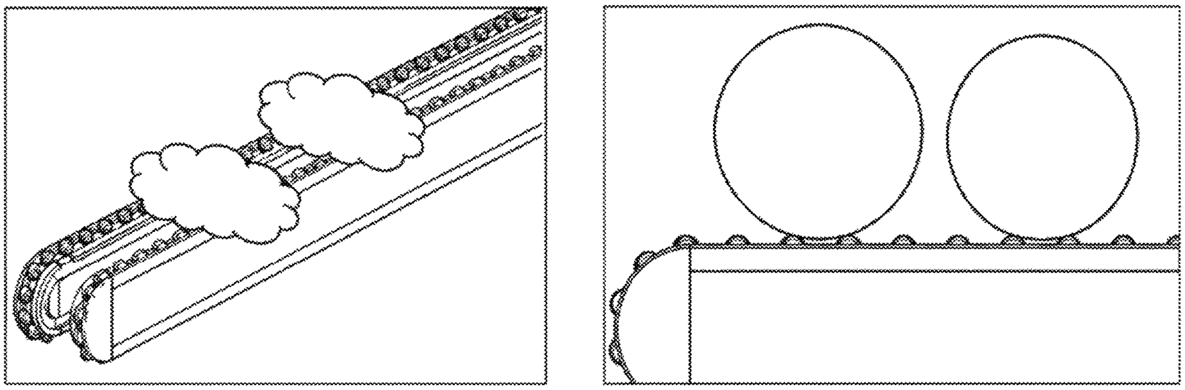
FIG. 3 schematically illustrates various examples of a bead chain for transporting and/or dispensing one or more items, in accordance with some embodiments.

As shown in FIG. 3, another way to create positive features for controlling or restricting item movement during dispense is by using a bead chain or a ball chain to convey items. In some cases, a continuous strand with larger, spaced out features may enforce a predetermined or desired spacing between items to stop them from rolling during conveyance. A bead chain may be easier to clean than a typical roller chain. It can be made without cavities or mechanical joints that would pinch items or collect debris. It can also slide along a continuous track rather than needing rollers which would similarly trap debris. Within one chain, the spacing, size, shape, and/or material of the beads can be varied to better hold different types of items. Different regions of the chain can be used depending on the items being dispensed.

Tongue Conveyor Engagement-Bead Chain

The bead chain can also be used to control a tongue conveyor. When a tongue conveyor is lowered onto the dispense arm, fingers on the tongue may wrap around a section of the bead chain. Pins on the tongue may drop into slots on the dispense arm to capture the tongue. The tongue may be pulled forward by driving the bead chain to dispense one or more items from the tongue. Rather than falling off the dispense arm, the tongue may be captured in the slot. When the dispense operation is complete, the tongue can be retracted by driving the bead chain in a reverse direction.

Raft Capture on LFB

Individual rafts can be used in a tray to support floppy items. In some cases, the individual rafts may be dispensed into the LFB along with the items they are supporting. This may be disadvantageous, since the rafts may need to be retrieved from inside the bag, among the customer's items. This is a manual and time-consuming process. Further, the rafts occupy a volume that takes away from the space for other items and risks damaging other items. To address these scenarios, the rafts can be captured using a collecting bin located at the front of the VLS or at the front of the LFB.

In some embodiments, the raft (dashed line) may be conveyed until it tips off the front of the dispense conveyor arms. The tipping raft may catch on the front slot on the LFB while the item is tipped into the bag. The dispense arm may extend until the raft aligns with the LFB slot. The raft may then slide into the LFB raft bucket. This process allows all of the rafts to be retrieved simultaneously and automatically, and prevents rafts from interacting with items in the bag.

Cartridge Conveyor

In some embodiments, one or more cartridge conveyors may be used to handle, convey, and/or transport items towards a target location. The target location may comprise a bag, a package, or a structure or platform in or on which one or more items can be placed. The one or more cartridge conveyors may be configured to hold the one or more items in a predetermined or desired orientation during storage, handling, conveyance, or transport of the one or more items to the target location. In some cases, the items to be handled or dispensed using the cartridge conveyor may be placed, stored, or held on a support. The cartridge conveyor may be configured to dispense the items from the support in or on which the one or more items are placed, stored, or held.

Figure 12:
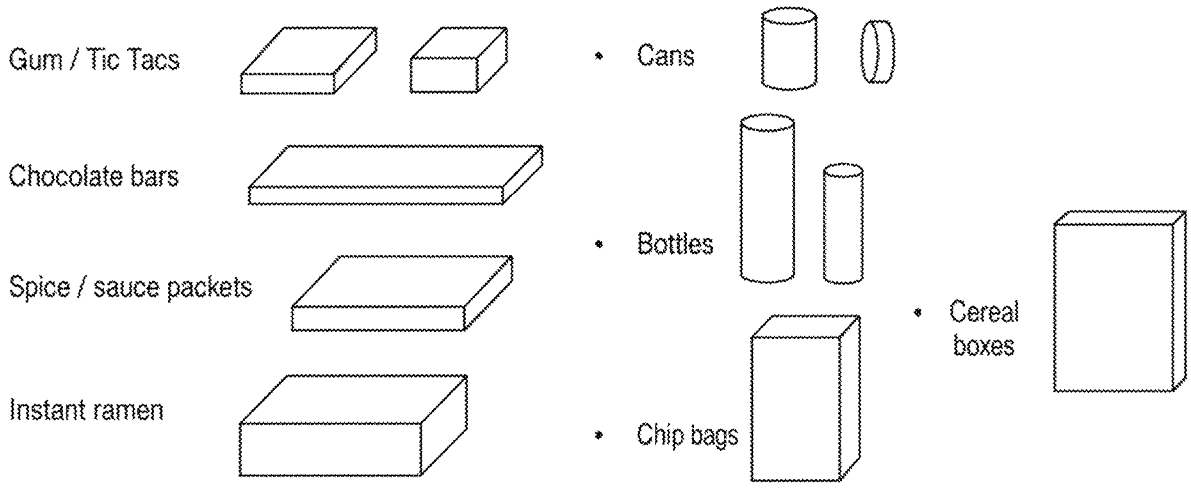
FIG. 12 schematically illustrates various examples of items that may be suitable for storage, handling, or transport using a cartridge conveyor.

FIG. 12 illustrates various examples of items that may be suitable for handling, transport, or dispensing using a cartridge conveyor. The items may comprise, for example, small items of a thin or planar form factor such as gum, Tic Tacs, chocolate bars, spice or sauce packets, instant ramen, cans, bottles, chip bags, cereal boxes, and the like. Such items may typically be stored in a low-density configuration when placed on a standard tray or support because they require storage or placement in a flattened orientation on a tray or support, and may not be dispensed reliably when stored in a tray, or may not remain stationary when the tray is moved or transported. Further, such items may be difficult or challenging to load into a tray or unload from a tray. In some cases, the storage or placement of such items in a tray can also result in wasted vertical storage space (e.g., the tray and buffer headspace can be at least 50 mm for products that are often less than 10 mm tall when stored flat).

In some cases, it may be possible to store items more densely when the items are stored vertically. The usage of vertical space can be further optimized by adjusting the vertical space between various supports or trays each holding multiple items that can be oriented vertically. The various supports or trays may be arranged such that a first support or tray holding a first plurality of items in a vertical configuration is positioned above a second support or tray holding a second plurality of items in a vertical configuration. The first support or tray may be positioned at a different vertical height than the second support or tray. The vertical clearance between the first support or tray and the second support or tray may be sized or dimensioned to accommodate a storage of plurality of items that are arranged or held in the second support or tray in a vertical or substantially vertical configuration.

In an additional example, items can be reoriented vertically to achieve a higher packing or storage density by virtue of the form factor of the items. In some embodiments, items of a certain form factor (e.g., flat and/or thin) can be reoriented and stored in a vertical orientation, which can free up additional storage space in a tray or a support for additional items of a same type or of a different type. In some cases, the additional storage space may permit the use of multiple lanes in a tray or a support for storing or holding various items, which can provide for some redundancy in inventory so that a vertical lift system can be used to retrieve items associated with a customer order from a plurality of different lanes or trays. Storage of items in a vertical orientation can also reduce the number of trays needed to store the items, which can reduce capital expenditure while maximizing the number of products that can be stored on a single tray, and allow for more frequent dispensing of items from a same tray. Storage of items in a vertical orientation can also allow a user or operator to load more items and products onto a same tray at a time, which can result in more efficient tray loading, higher volumes of item induction onto trays or supports (which can reduce or eliminate the need for a stockroom), and allow operators to order more items at a time less frequently, so that item purchasing and receiving is more efficient.

An example of a cartridge conveyor can be used to handle and/or dispense items stored in a vertical orientation. The items may be stored in or on a tray or a support. In some cases, a bead chain can be used to drive a rigid back plate forward towards a dispense direction or location. In some cases, the bead chain may be used to ratchet the back plate forward or backward in a controlled, incremental fashion. In some cases, the rigid back plate may be used to keep the items in a stable, upright position by providing or exerting a force to hold the items in the stable, upright position. The items may be held in the stable, upright position using the rigid back plate positioned at one end of the items and a gate or brush positioned at another end of the items. The rigid back plate and the gate or brush may be configured to collectively hold the items in the stable, upright position.

In some cases, the items may be placed on a support that is configured to sit within a tray. The support may be supported by pins that can be picked up by a side action of the bead chain. The bead chain may be configured to move freely in a clockwise or counterclockwise direction.

In some cases, the cartridge conveyor may comprise a gate of spring loaded rollers or brushes that can physically restrict or enable a movement or dispensing of the items from the cartridge conveyor. In some cases, the conveyor may comprise side walls that can move inward or outward to adjust for a range of different product or item widths.

The cartridge conveyors described herein can allow for quick loading of items, in some cases at or near an edge of the support or the tray. The cartridge conveyors may be configured to provide, enable, or otherwise facilitate more reliable singulation of items, prevent front item roll-off, and guide items into a vertical drop instead of dispensing the items by way of a swing/topple drop. The cartridge conveyors described herein may be stable for hub to edge tray shipping. In some cases, the items may be retained in the support or tray for a long period of time without requiring a shuffling or reordering of the items. The cartridge conveyors may not or need not shuffle the items, and the items may be retained in the support or tray in the configuration or order in which the items were initially loaded until the items are dispensed and the cartridge is empty. In some cases, the logistical savings from infrequent reloading of the items (due to the high packing density achievable when the items are vertically oriented for storage) may outweigh any potential downsides relating to long item retention and empty space penalties associated with the retention of the items.

An example of a cartridge tray can be used to handle and/or dispense items stored in a vertical orientation. The cartridge tray may comprise a specialized or customized tray for cartridge dispense using the cartridge conveyors described and referenced elsewhere herein. In some cases, the cartridge tray may be configured to extend over a bag. In some cases, the cartridge tray may comprise one or more standard lane supports, one or more lane dividers, and one or more brush sides and/or brush gates configured to selectively restrict or permit a movement of the items past an edge of the tray and apply friction for singulation of items.

In some cases, the cartridge tray may be manipulated using a bead chain that is configured to drive a rigid plate back and forth (e.g., using a ratcheting mechanism as described above).

Load Cell Dispense Recognition Concepts

A variety of methods can be implemented to detect when an item has left the dispense conveyors. One method is to use load cells in different locations on the dispense arm to determine when there is a weight change on the dispense arm. The load cells can also be used to determine if an item has accidentally fallen off a conveyor sideways or backwards.

In some cases, the load cells may be provided on the dispense arm. This configuration can be used to detect a change in mass at the tip. In some cases, the load cells may be provided under each dispense arm. This configuration can be used to detect the weight of the entire row of items on the conveyors and the change in weight at the tip. In some cases, the load cells may be provided under the rails that the dispense arms move on. This configuration can be used to detect the weight of the entire row of items on the conveyors and the change in weight at the tip.

Moment Sensor

In some cases, a strain gauge may be provided on the compression side of the dispense arm to detect a moment of the cantilever section of the arm. Items may be moved along the length of conveyor, which changes the compression. Such changes in compression may be detected using the strain gauge or any other type of moment sensor.

Under Each Arm

In some cases the load cells may be located underneath each dispense arm. Each arm may measure the total weight or mass of the items on the dispense arm. In some cases, drops may be identified by measuring or detecting a load leaving the arm.

Under the Rails that the Arm Moves on

In some cases the load cells may be located underneath the entire arm and rail assembly. Total weight may be measured for items that arrive on the assembly. Drops may be detected when items are being dispensed off the assembly.

Computer Vision Dispense Recognition Concepts

As described elsewhere herein, load cells can be used to detect if items are successfully dispensed into an LFB bag. In some embodiments, computer vision techniques can also be used to detect if items are successfully dispensed into an LFB bag.

One one or more overhead cameras may be provided that face straight down towards the floor, so that they can get a clear view inside the LFBs. In some cases, the one or more overhead cameras may be angled relative to the LFBs. In any of the embodiments described herein, the positions and/or orientations of the overhead cameras may be adjusted (e.g., manually or automatically using one or more motors or actuators) in order to capture images or videos of the LFBs or any items in the LFBs from an optimal position or angle. Depending on the field of view of the camera, the imaging can take place when the LFB is positioned directly under the camera or nearby. The LFB can even be in motion.

During each dispense routine, one of the cameras can take a “Pre-Dispense Image” before the item is dispensed into the bag, followed by a “Post-Dispense Image” after the dispense has occurred. The system may comprise a processor that is configured to detect and/or identify one or more items in the “Pre-Dispense Image” and/or the “Post-Dispense Image” using computer vision techniques. The “Pre-Dispense Image” and/or the “Post-Dispense Image” may be captured using the same camera, or using different cameras at different dispense bays around the facility. The “Pre-Dispense Image” and/or “Post-Dispense Image” may be used for order building, order verification, and to track errors in dispense routines, as described in greater detail below. In some cases, a “Post-Dispense Image” for a first dispense action at a first dispense station may be used as the “Pre-Dispense Image” for a second dispense action at a second dispense station.

As noted above, computer vision techniques can then be used, taking both images and the additional associated data as inputs, to assess if the dispense was successful. Certain cameras (e.g., depth cameras, TOF sensors, RGB-D sensors) can provide both RGB images and depth point cloud data, and both of these modalities can be analyzed to determine dispense success.

In some cases, classical computer vision techniques can be applied to the RGB stream. For example, object tracking techniques, such as MOG (“mixture of Gaussians”) can be used to isolate newly present items from the background. In some cases, blob detection, edge detection, and/or contour detection techniques can then be used in combination with the known item attributes (e.g. dimensions, shape, etc.) to detect item quantities and locations.

In some cases, items can also be filtered out from the background bag (which may have a known color, such as green) based on the known hue of the items. This can be achieved by transforming images from one color space to another color space (e.g., RGB color space to HSV color space).

In some cases, machine learning object detection and segmentation techniques can also be used to analyze the RGB stream. Simple difference analysis on the depth streams between the two images can also implemented. Different levels of decimation of the depth point cloud data can be used to balance resolution and processing time.

In some embodiments, RGB analysis, depth analysis, and provided target location for the dispense can all be combined and weighted to generate a prediction of where the item landed in the bag. This can also be represented by a probability distribution of where the item is located in the bag. Dispense recognition result can be weighted by imaging modality. The dispense recognition result for each modality can be aggregated to generate a combined belief or prediction for where an item landed.

Customer Bag and Transport Design

Line Following Robot (LFR) Sorting Tool

A conveyor on a line following robot (LFR) can be used to sort items from the middle of a tray lane. One or more items can be brought onto the LFB in order to have the following item dispense into a bag. Then the other items can be put back. The LFR Conveyor may be on its own LFR and an LFB may come in mid sort to retrieve an item. Alternatively, the conveyor may be on the LFB that the desired items gets dispensed into.

Line Following Cart (LFC) with Tilt Function

As described elsewhere herein, a raft may be used in combination with the systems of the present disclosure. The raft may comprise a piece of material that an item sits in. The raft may sit in the tray. The raft may be used for transporting and dispensing oddly or uniquely shaped items that may not lift well using the dispense conveyors.

In some cases, one or more line following carts (LFCs) may be used. The LFCs may comprise a bristle platform on top that allows the dispense arms to poke through such that an item can rest on a top portion of the bristles. The LFCs may be used for items that are large and may not fit in a bag, or items whose orientation cannot be changed.

The LFC may be modified so that it can tilt at an angle in order to slide objects off of it. This may be helpful at the pickup area. For example, an LFC can bring a pack of paper towels to the front, then tilt so that the paper towels slide off onto a table or shelf. The LFC with tilt functionality can also be used to transfer items from the LFC to an LFB. For example, the two bots may move next to each other and the LFC may be configured to move or direct one or more items into the LFB.

Another possible configuration is that the LFC bristles may be provided over a bag such that the bristles cover a portion of the bag opening. A small, fragile item (e.g., a ripe peach), may be placed on the LFC bristles. Then, the bristles may be lowered to the bottom of the bag and tilted so that the item only drops a very short height into the bag.

Tray Rack with Dispensing Underneath

The tray racks may be designed so that an LFB can enter below it and items can be dispensed into the LFB. This creates a "flex" storage configuration that provides a space underneath the overhang which can allow for big racks to come in for replenishment. During peak hours this space can be used for static storage.

Docking a Tray Rack

The tray rack may be docked to the VLS so that the floor going robot does not have to perfectly align with the VLS. Handoff can occur with aid of a kinematic constraint system using tooling balls, cups, cones, and/or wedges.

LFT Rack to Deliver Bulk Goods to Pickup

In some instances, the LFT may dock to the VLS and a tray with bulk goods may be placed into the VLS. The LFT may be configured to travel to pick up the items, which get taken off of the tray at that location. Alternatively, a dispense mechanism may be used to dispense items onto a bottom shelf of the LFT. The LFT can then travel to pick up the items, which are taken off of the LFT at that location.

Multiple LFB Decks

Figure 4:
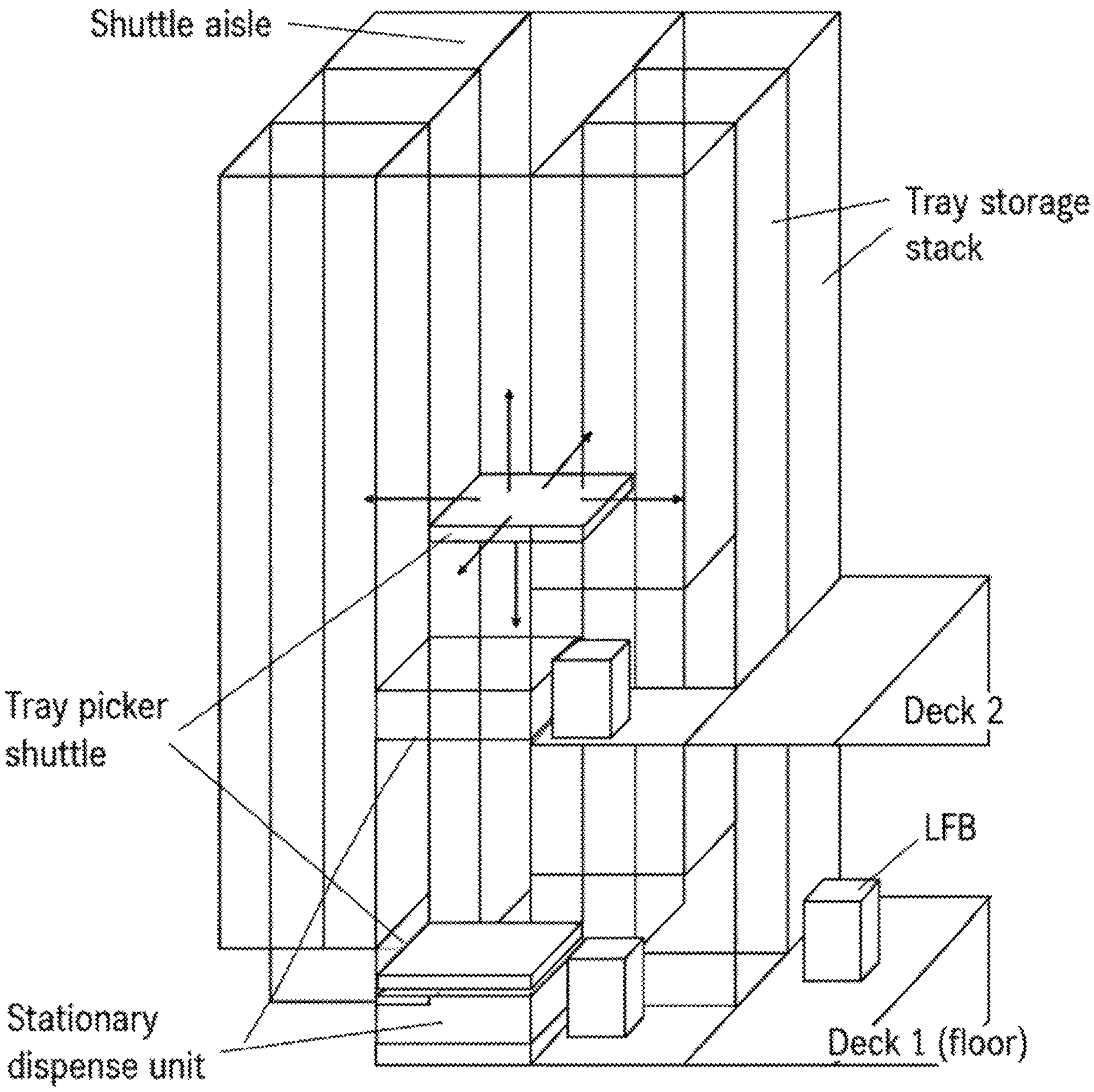
FIG. 4 schematically illustrates a plurality of line following bags (LFBs) that can receive one or more dispensed items, in accordance with some embodiments.

As shown in FIG. 4, in a shuttle system, a plurality of LFBs can be provided to receive one or more dispensed items. The plurality of LFBs can be distributed across multiple levels or decks or floors. This can increase throughput and system density. In some cases, tray picker shuttles can enter a column of dispense units horizontally, then drop down onto one or more of the dispense units.

Small Format Systems

In some cases, the systems and methods of the present disclosures may be implemented for facilities that are at least about ~1,000 square feet (SQFT), and that can process tens of thousands of orders per week or more. In some cases, the systems and methods of the present disclosure may be implemented for facilities that are at least about 100 SQFT, 200 SQFT, 300 SQFT, 400 SQFT, 500 SQFT, 600 SQFT, 700 SQFT, 800 SQFT, 900 SQFT, 1000 SQFT, 2000 SQFT, 3000 SQFT, 4000 SQFT, 5000 SQFT, or more. Some conventional storage and retrieval systems may not be compatible with or adapted for storing and retrieving items in operating environments with a small physical footprint. In such operating environments, a smaller AS/RS form factor may be required. The system and methods of the present disclosures may be adapted and implemented for smaller operating environments while still maintaining high throughput and efficiency.

In some embodiments, shuttle or mini-load technology may be used as the basis for a storage and retrieval system. A shuttle can fit better in a facility with a low ceiling height because it does not need to be tall and can be as long as the space needs. Such a system may comprise one or more features or characteristics of the systems described above, or may be a smaller version of such systems. The system may comprise a more specialized configuration, such as, for example, a shipping container or truck trailer that has the automation equipment built into it.

Container/Trailer Layouts

A shipping container or trailer can be fully built and tested in a low-cost manufacturing region, and then shipped to its final location. No installation or set up may be required besides adding a power source. This would be a very simple, low-cost way to expand quickly into new locations at low cost. In some cases, the container/trailer may be designed with a single aisle down the center for a shuttle to run down. At the end with the door, one or more dispense conveyors may be installed to accept a tray and dispense one or more items into a receptacle. The same shuttle may also be used to reload the trays into storage.

An alternative method is to use the AGV AS/RS design as the basis. In this layout, shelves may be packed densely into the container. Popular SKUs may be placed at or near the front. An AGV may be configured to travel underneath the shelves to lift them up and move them to the dispensing conveyors. A lift may be used to pick a tray and present it above the dispense arms where an item may be removed and dispensed onto a support or into a receptacle. The tray and shelf may move back to storage until needed again.

In some cases, a storage configuration comprising a gantry system (similar to the mini-load configurations described elsewhere herein) may be used for container or trailer layouts. Such a storage configuration may comprise two gantries on each side of an aisle, and picker robots can travel along or alongside the aisles to pick from each side of tray storage. In some embodiments, multiple gantries may be provided on each side of an aisle. The multiple gantries may comprise at least two, three, four, five, six, seven, eight, nine, ten, or more gantries. The multiple gantries may be arranged in a lateral configuration along a length of the aisle. In some cases, one storage row may have multiple gantries on each side of the storage row. The multiple gantries may be arranged along the length of the aisle. In some cases, the multiple gantries on each side of the storage row may be provided in different aisles located on different sides of the storage row.

Double Shuttle Tray Picker

One way to increase throughput is to provide a shuttle that can hold two trays at the same time. This enables the shuttle to pick one tray, drop it at a dispense conveyor, go pick a second tray while the first tray is dispensing an item, then switch the trays out to ensure a minimal cycle time between dispenses. In some cases, the shuttle may be configured to travel in y and z. In other cases, the shuttle may be configured to travel in z or y only. In some cases, the shuttle may comprise one or more levels for holding multiple trays.

Multi Temp Zone Container/Trailer

The container may comprise multiple temperature zones for storing different items at various temperatures. The automation equipment may be designed to work in each of these different environments. The container may comprise a frozen storage section in the back, a refrigeration storage section in the middle, and an ambient temperature section in the front. The shuttle and/or the tray racks may be configured to move between the different environments as needed or when needed. Another alternative is to design the refrigeration barrier to be along the length of the container and have the automation equipment operate on each side permanently.

Shuttle with Dispense

A variation of a shuttle and dispense architecture may comprise the dispense system that is collocated with the shuttle. The shuttle may have a large hole in the center with rails on each side. Two dispense conveyors may be attached to the rails and may move, independently, in the X direction. When a tray is pulled onto the shuttle, it may pop through the slot of the tray, lift one or more items, advance the conveyor forward over the edge of the shuttle, and then dispense the one or more items off the end of the conveyor. The item may be dispensed into a receptacle that is provided separate from the shuttle.

Shuttle with Dispense and Bag

Instead of dispensing off the conveyor into a receptacle off the shuttle, the receptacle may also be on the shuttle. One or more receptacles may be located on one or both sides of the shuttle. In some cases, a movable mechanism on the shuttle can be used to remove the receptacle. The receptacle may comprise a bag or a box. In some cases, the bag may comprise a collapsible bag whose bottom starts at the top and lowers down (similar to LFB).

Trays

Inverted T Tray Support Concepts

Figure 5:
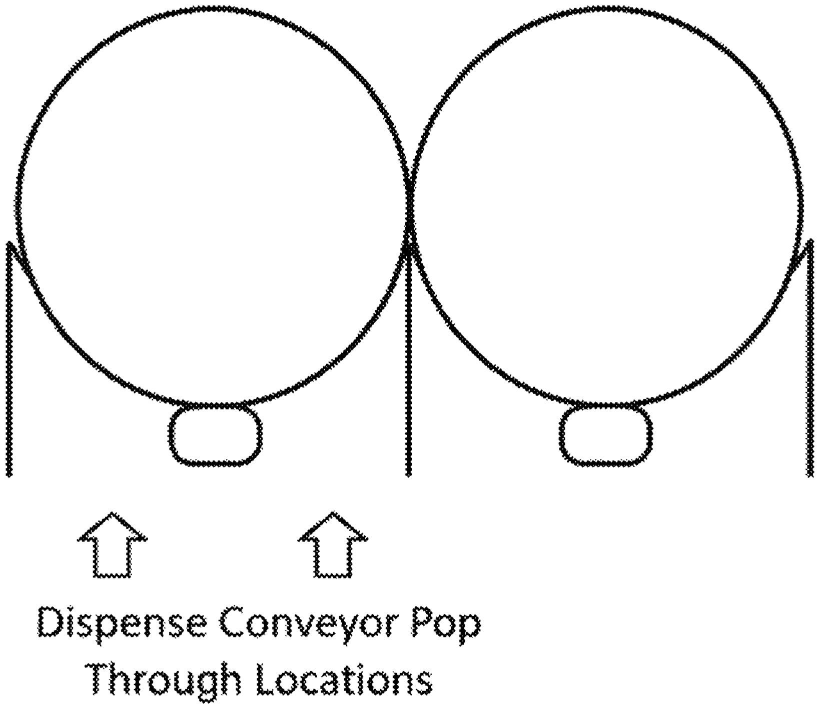
FIG. 5 schematically illustrates various examples of tray supports for supporting one or more items in a tray, in accordance with some embodiments.
Figure 5:
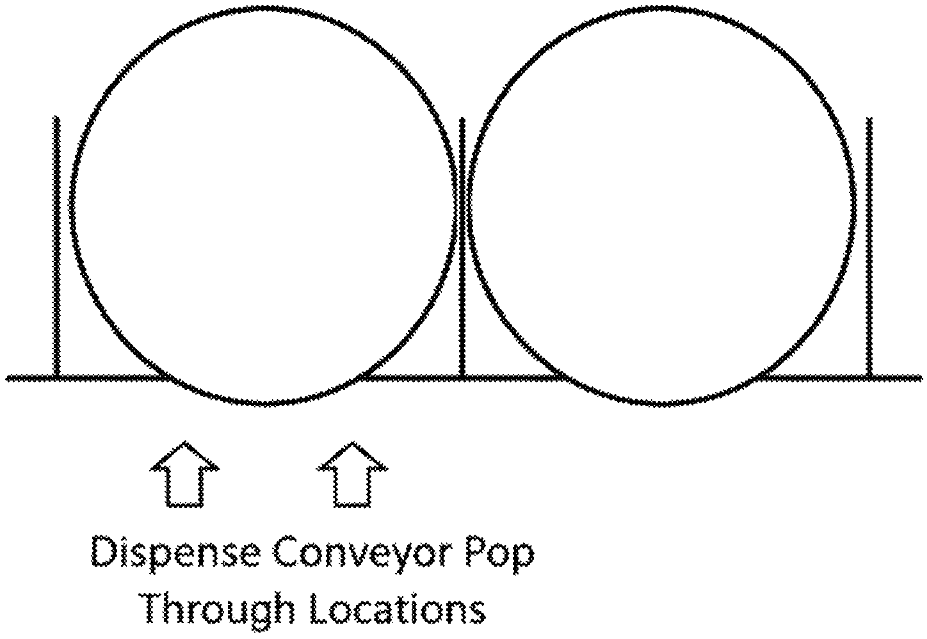

The present disclosure provides various configurations for supporting an object in a tray that works compatibly with the dispense conveyors disclosed elsewhere herein. For example, as shown in FIG. 5, one configuration may comprise a center beam support with divider walls and pop through slots on the outside of support. Another configuration may comprise an inverted T with supports on the outside and pop through slots on the inside. The inverted T may be better for smaller lane trays and can also lower round and cylindrical items down in the tray so that storage density can be increased.

Sliding Lanes

The trays disclosed herein may comprise platforms that can be pulled and pushed. The trays may not have gaps for pop-through conveyors. The trays may have a low-friction surface to allow for "lanes" with items to slide back and forth along the surface of the tray. The tray may have grooves for wheels or another feature to assist with lane sliding and to ensure that the lanes stay in the correct horizontal position.

Figure 6:
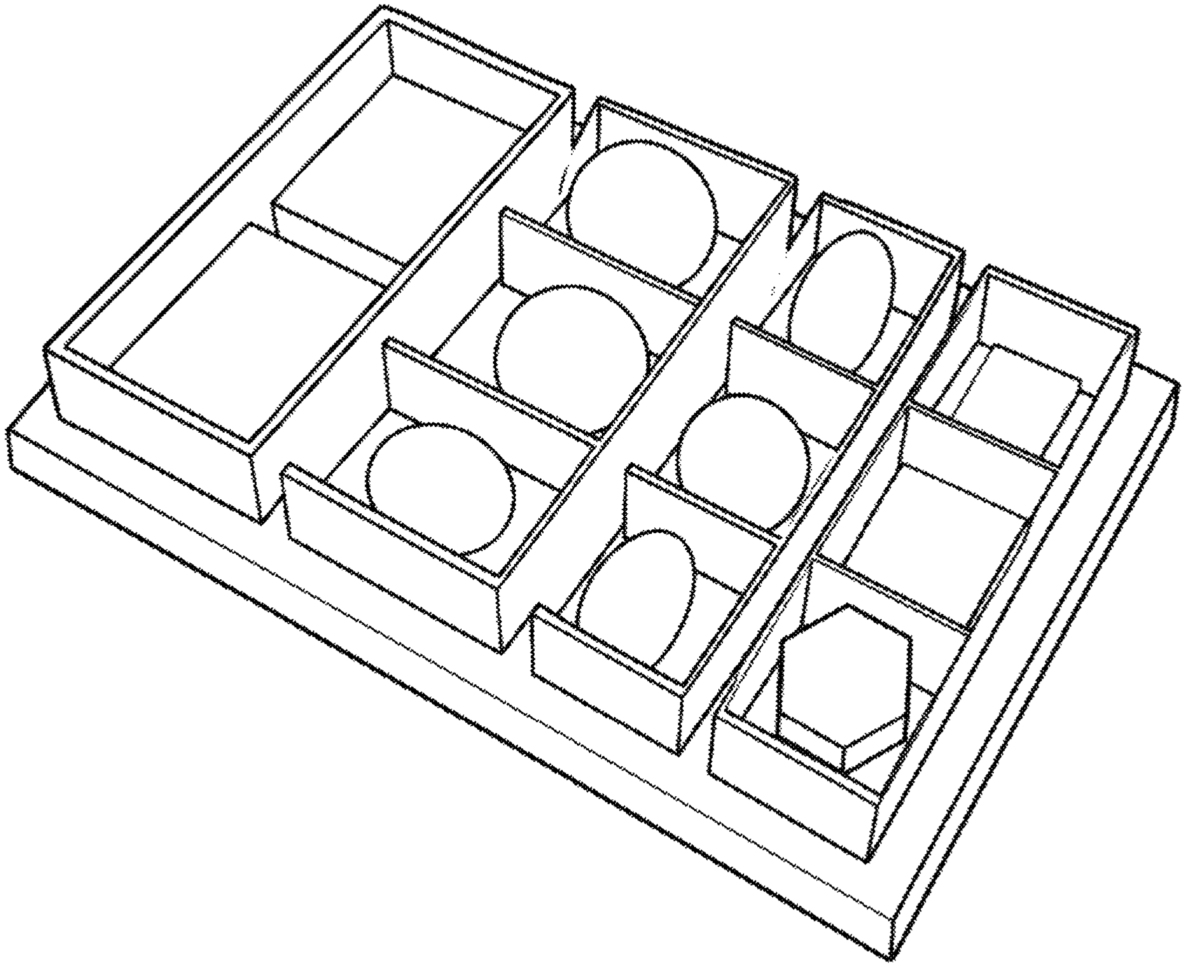
FIG. 6 schematically illustrates a tray comprising a plurality of lanes, in accordance with some embodiments.

The trays disclosed herein may comprise one or more lanes. The lanes may contain items, and may be configured to slide back and forth on trays. As shown in FIG. 6, a tray may comprise multiple different types of lanes. The tray can also have a combination of different lane types and sizes. For example, the tray may comprise type A lanes for standard item shapes, which slide in deterministic ways when pushed (e.g., items with standard dimensions, standard shapes, etc.). The tray may also comprise type B lanes for oddly shaped items (e.g., items that don't come in uniform size or items that do not slide easily). Each lane may be configured to hold different items. In some cases, dividers may be used to separate items within a single lane. The dividers may be easily insertable, removable, and adjustable in position along a length or a width of the lane. In some cases, the dividers may have hinged flaps to go under the items and assist with sliding the items. In some cases, the containers can be designed to be adjustable in one or more dimensions.

The locations of the one or more items can be precisely defined and recorded during tray loading and/or induction with the help of the new lane container structures and one or more dividers. Rather than trying to detect features on items, of which there are thousands of variations, an inspection algorithm can be configured to look for consistent features on containers and/or dividers in order to define item locations.

Figure 7:
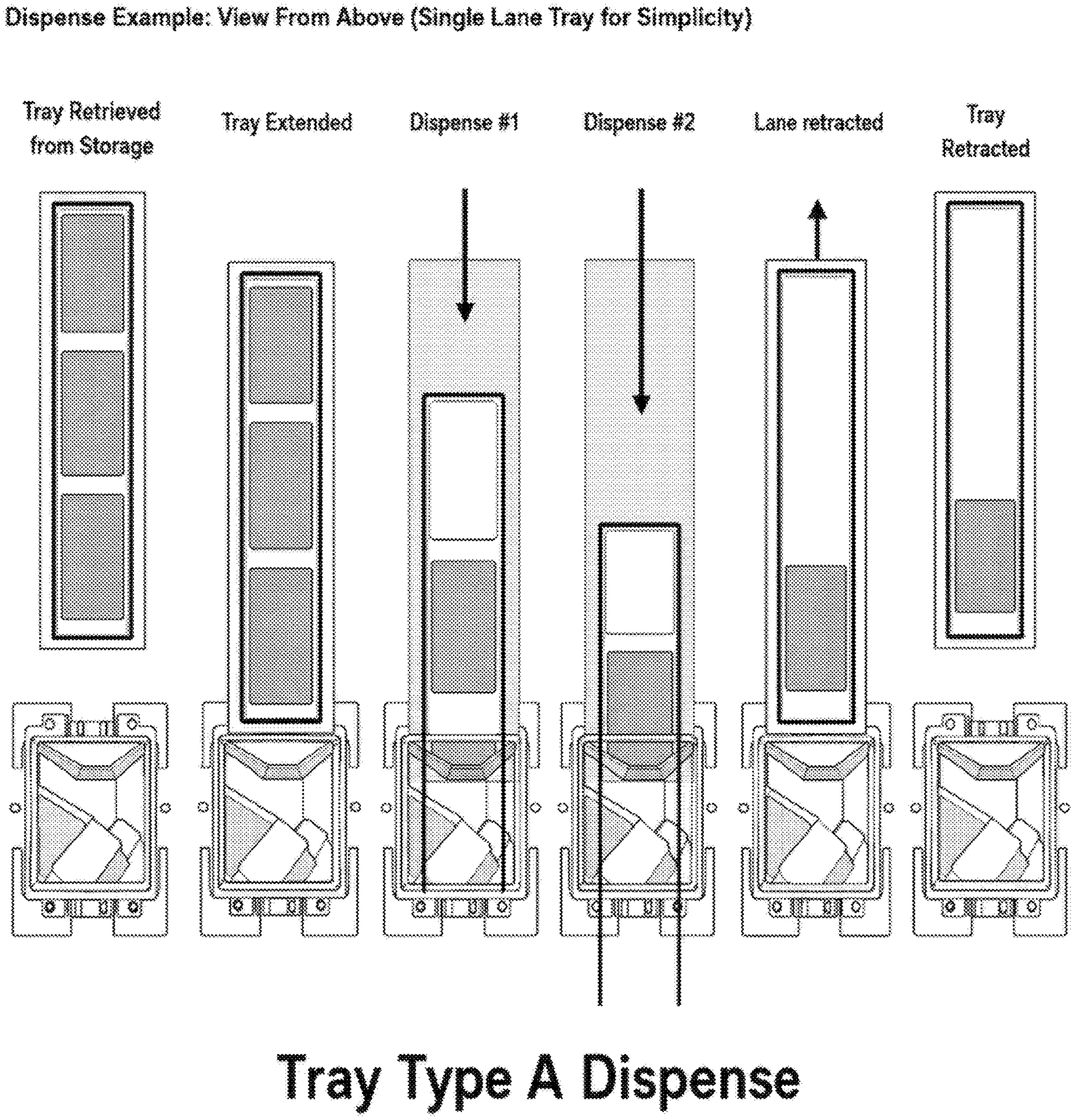
FIG. 7 schematically illustrates an example of a dispense operation for a single lane tray, in accordance with some embodiments.

FIG. 7 shows an example of a dispense operation for a single lane tray. Trays may need to be extended out of the bay for items to reach the LFB for the drop. A multi-axis system may be used to line up the tray with a lane and push and/or pull so that the lane slides along the tray. For Type A lanes, items may be loaded at induction as close to the front of the tray as possible. The dispense distance may be the length of the item. The distance may be adjusted based on induction image information if a lane is not full.

Clip on Tray Dividers

Some items are harder to control with the standard tray design, making their dispense operations less reliable. This can be addressed using a system of addons that are quickly clipped onto or removed from the standard lane dividers. This configuration allows existing trays to hold a wider variety of items by adjusting on a per-lane basis the lane divider height or thickness, or by adding compliant features like bristles, etc.

Sanitizing Tray

It may be necessary to regularly clean the dispense arms during normal operation. The contents of a normal tray can be replaced with a downward facing UV light, cleaning solution-soaked sponge, etc. The sanitizing tray (gray) may be held in storage and picked by the elevator (blue) as normal. By picking this tray and holding it against the dispense arms (green), the belts can run against the sanitizing equipment (yellow) to clean the dispense tool without requiring human input or intervention.

Tray Flaps

Figure 8:
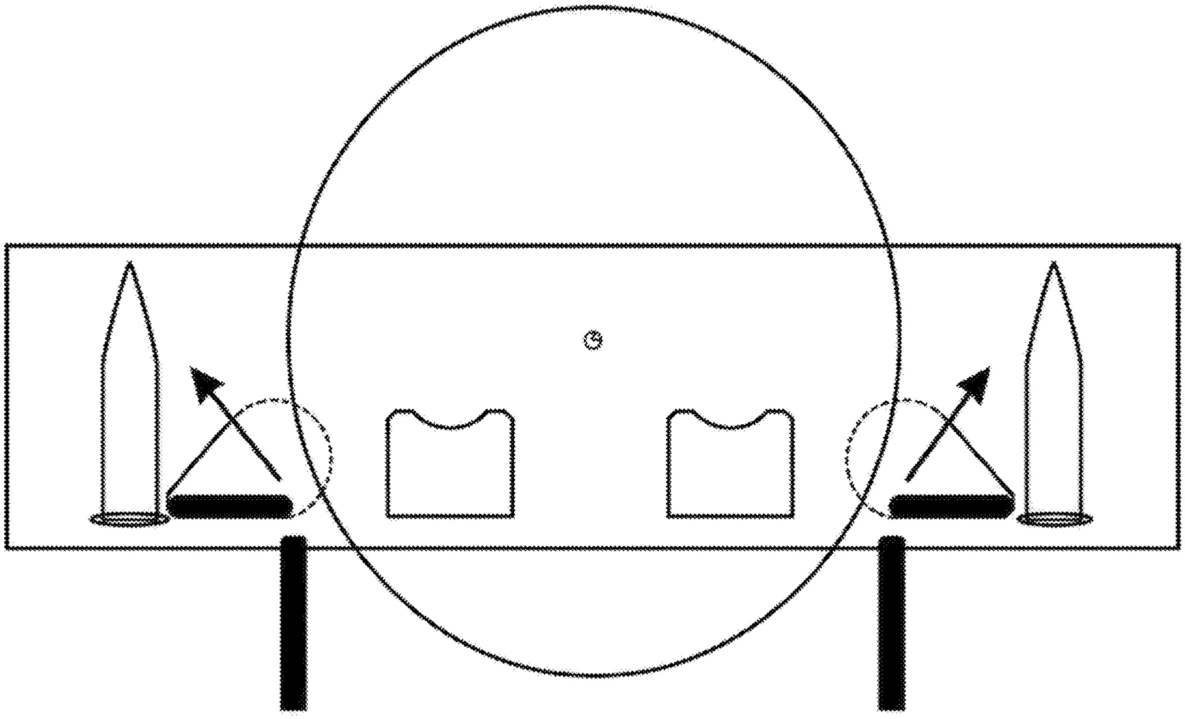
FIG. 8 schematically illustrates one or more pivotable tray dividers, in accordance with some embodiments.

One limitation of existing trays is that, for small items, the outer lips on the tray may need to be large enough to support the item. This reduces the space that is left available for the dispense arms to pop-through the tray. The reduced space creates a narrower stance for the dispense arms and increases the likelihood that items can tip off the side. As shown in FIG. 8, one solution to this problem is to allow the tray dividers (shown in blue) to pivot upward and outward when the dispense arms pop-through the tray. This means the tray lips and dispense arms can occupy the same projected space. In this case the dispense arms can have a wider stance and therefore more stability in picking up the item.

Software Inspection+Quality Grading

Full Tray Imaging—Applications

Trays can be imaged from above to inspect items for quality control purposes. This may be beneficial at several stages in the process. For example, when manually loading a tray, an image of the whole tray may be taken during loading and/or after loading. This can help to identify mistakes during loading such as incorrect items, placements, orientations, etc., inspect the quality of the items (packaged or fresh), and/or segment pictures of each item in order to provide the specific item to a consumer. Tray imaging can also occur when autoloading a tray post quality inspection. This can help to identify mistake during loading like incorrect items, placements, orientations, etc., detect when a tray is in storage or on a dispense station, identify and/or correct mistakes during dispensing or storage process, identify features to improve the dispensing process, inspect the quality of the items (packaged or fresh), verify that the correct tray was presented, or verify that the item count per lane match inventory expectations. The images can be taken with a standard camera, a video, a depth camera, or any other type of imaging sensor.

In some cases, the trays can be imaged from straight overhead or at an angle. If at an angle, a calibration operation may be performed to align color pixel coordinates and depth data into a coordinate system parallel to the tray plane. The calibration operation may use a combination of RGB and depth data to extract the placement, size, and/or orientation of items in the tray and report back to other automation systems.

Full Tray Imaging—Techniques

The present disclosure provides more effective approaches and solutions for combining depth and RGB color data, and implementing new machine learning methods to improve the use of localization in tray packing validation.

Inventory metadata may contain item size, packaging type, and accepted orientations for a given tray type. RGB ML models may be trained to locate and identify different package types on the tray and can alert operators if identified packaging on tray lane does not match inventory data. These models can also be trained at different product resolutions, for example, for individual items, SKUs, product categories, shapes, etc.

In some instances, classification can be based on packaging types (i.e. glass, long neck, bottle or tetra pack carton) as opposed to precise item identification, which allows for quick adjustments to new product lines without additional model training.

Figure 9:
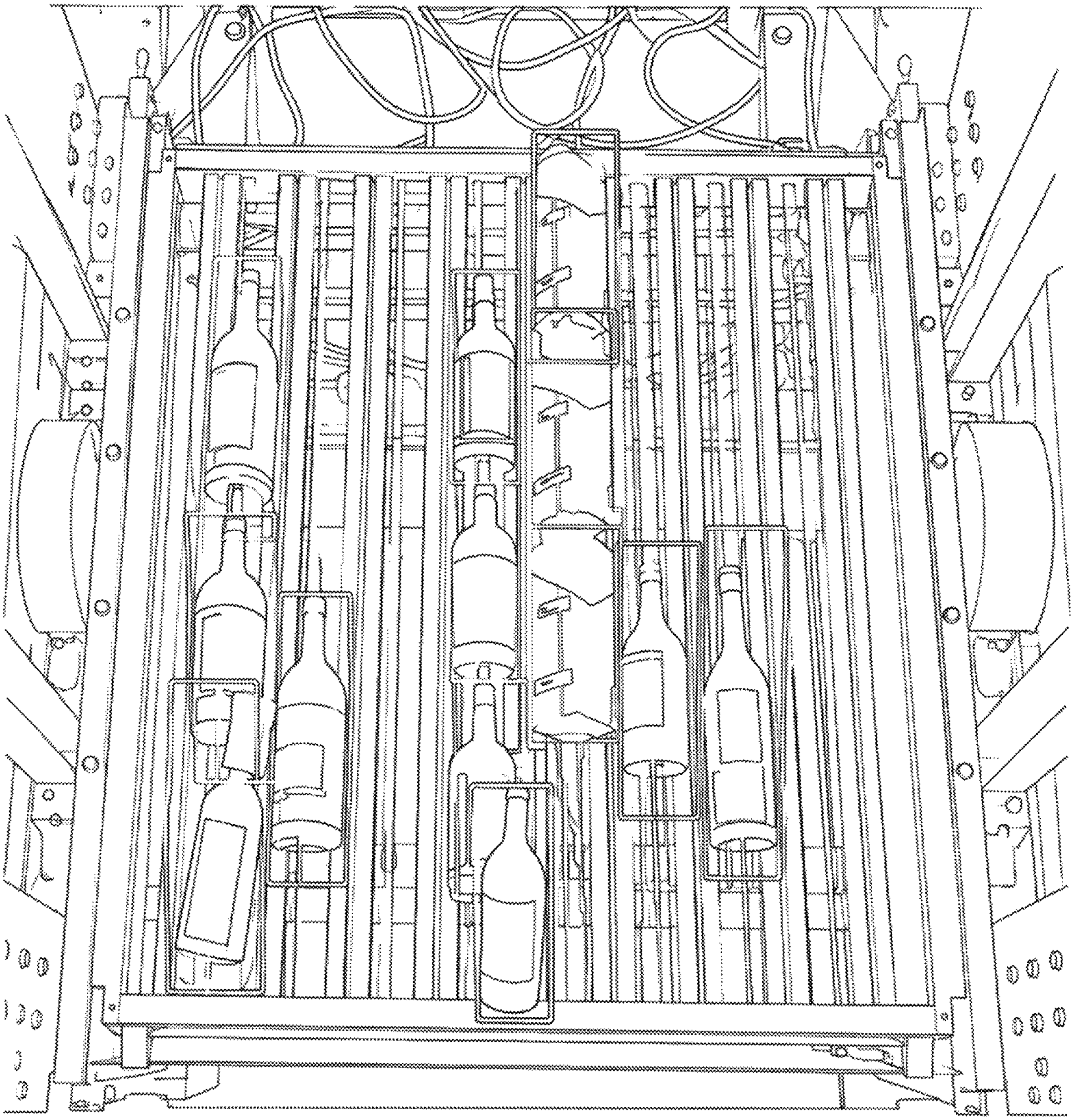
FIG. 9 schematically illustrates a localization and classification of items in one or more lanes of a tray, in accordance with some embodiments.

Localization data can be improved by estimating X and Y coordinates of each item's center point, height and width of bounding box, and θ of rotation on center. These dimensions in pixels can be scaled using a depth data calibration to estimate or determine real world dimensions and positions in three dimensional space. Operators can be alerted if items appear too large, an incorrect count is detected, or if items are tilted beyond orientation constraints associated with the items. As shown in FIG. 9, items may be localized and classified on an individual basis and aligned in lanes based on a location of a center of an item. In some cases, items may be masked using a mix of RGB and depth data, and item distances to a leading edge of a tray may be reported to an operator. Lanes with all correct item types but improper counts may be flagged for potential inventory error. Lanes containing an incorrect packaging type may also be flagged for potential dispense rollover errors. An operator may receive an alert for the various errors or potential errors flagged by the system.

Image from Below During Tray Loading

When manually loading a tray, a camera can be pointed down on the top of the tray to image everything facing up. In some cases, this can leave the bottom of items uninspected. To solve this, a camera can also be provided next to the tray loading station that is facing up. As a person (or pick and place robot) takes an item out of a box, they can move it over the camera to trigger a picture, then place it in the tray. Then an analysis can be done on both the bottom and top pictures in order to evaluate any quality control issues. Some alternative methods may involve flipping the items individually or as a group so that both sides can be imaged. Flipping may comprise, for example, individual flipping, where a pick and place robot or some gantry system with suction cups or grippers can be used to flip each item one at a time. Flipping may alternatively comprise group flipping, where an empty tray can be placed over a full tray, post top picture. Then, both trays (now sandwiching the items between them), can flip or be flipped as a single unit. Then another picture can be taken from the top again. But this time, the bottom of the items may be facing towards the camera.

Image Capture for Order Building+Verification

In some cases, a Pre-Dispense Image and a Post-Dispense Image can be taken during dispensing of item(s) into an LFB. The Pre-Dispense Image and the Post-Dispense Image can be used to automatically detect if the dispense was successful.

Throughout the entire fulfilment process for an order, one or more Pre-Dispense Images and/or one or more Post-Dispense Images can be compiled and associated with the relevant LFB bag and a particular customer order, thereby creating a complete history of the contents of each LFB at each stage of the fulfilment process. Each stage of the fulfilment process can correspond to the dispensing of one or more items in the LFB. The image history comprising such dispense images can be stored locally on site and/or in the cloud.

In some cases, the compiled image history of each bag can be used for Machine Learning Model Training. For instance, the compiled image history for each bag, along with associated inputs about which items and quantity of items were dispensed into the bag at each step, can be used to train machine learning models to confirm dispense accuracy in the future and automatically detect any potential accuracy errors.

In some cases, the compiled image history of each bag can be used for Individual Dispense Confirmation. The compiled image history can be used for internal purposes. For example, if a dispense sensor (optical, planar, load cell, computer vision, machine learning, etc.) indicates there was a potential error with an individual item dispense, or if there is disagreement between more than one of these sensors, the relevant dispense images can be displayed immediately to an operator (locally at the store, or at a remote location via the cloud) for verification in real time or later. In some cases, the status of every active order, bag, and/or dispense can be live monitored with a similar system by operational teams on site at each store, or at a remote control location via the cloud. This system would allow for confirmation of 100% accuracy in order fulfillment for every order before items are sent to customers.

In some cases, the compiled image history can be used for one or more external purposes. For example, these images can also be displayed for customers to provide live updates during order fulfilment. As items are added to each of the bags in their order, customers can check for fulfilment accuracy, quality, item damage, and provide live feedback to impact the fulfilment process.

Image Capture for Order Building+Verification, Continued

In some cases, the image capture systems disclosed herein can be used for Complete Order Verification. For example, pairwise comparisons for pre+post dispense images can be used to evaluate the success of one or more dispense routines. Combining these images for all of the dispenses for a single bag allows for examination of the entire history of the bag throughout its fulfilment. This allows for even more valuable applications. For example, before sending a bag to a customer, an operator (on site or remote) can easily confirm the entire contents of the bag. Without the full order history, this would not be possible, as items on the top of the bag may obscure items underneath. This complete image history may remove the need for individual human operators to remove items from the bag if they want to confirm that a bag is 100% accurate before sending the contents to a customer. This check may take place for every order, or for a subset of orders that have been flagged by automation sensors or operators as potentially having issues. In some cases, if items are missing from the bag, or there are extra items in the bag, the precise dispense routine that caused the error can also easily be identified and investigated. The order history may comprise one or more video clips from each dispense routine, rather than the still images shown in the example figures on these slides. The video clips may provide even more information about items as they are dispensed into the bags (e.g., the way the items fall or interact with other items in the bag after being dispensed), which can be particularly useful for damage assessment.

In an aspect, the present disclosure provides an order fulfilment management system comprising: one or more imaging devices configured to capture (i) a first data stream comprising a plurality of images or videos of a tray comprising one or more items and (ii) a second data stream comprising a plurality of images or videos of a receiving unit configured to receive the one or more items; and a processor configured to generate a filtered set of images or videos using the first data stream and the second data stream. The filtered set of images or videos may correspond to (a) one or more characteristics or properties of the one or more items, (b) one or more components or subsystems associated with a storage, handling, or dispensing of the one or more items, or (c) one or more parameters associated with the storage, handling, or dispensing of the one or more items.

In some cases, the one or more components may comprise the tray, a storage unit comprising the tray, a dispensing unit, a conveyance unit, or a receiving unit. In some cases, the one or more characteristics or properties of the one or more items may comprise a product type, a product shape, a product category, a product material, a packaging material, a product dimension, a product weight, or a stock keeping unit (SKU) associated with the one or more items. In some cases, the one or more properties may comprise a dimension, a shape, a color, a size, a weight, a material, or a material property of the one or more items. In some cases, the one or more parameters may comprise an order associated with the one or more items, a dispense order of the one or more items, a state of the receiving unit before or after the one or more items are dispensed, a failure detected with the dispensing of the one or more items, or a detection of one or more items in or on the receiving unit. In some alternative embodiments, the one or more properties may comprise information that is derivable by reading or interpreting a label associated with or affixed to the one or more items or a packaging for the one or more items. In some cases, the information derivable from the label may comprise a product code, product name, product weight, product expiration date, product ingredients, and/or product nutritional information.

In some embodiments, the first data stream may comprise one or more images or videos of the tray comprising the one or more items before the one or more items are transported from the tray or dispensed. In some embodiments, the first data stream may comprise one or more images or videos of the tray after the one or more items are transported from the tray or dispensed. In some embodiments, the second data stream may comprise one or more images or videos of the receiving unit before the one or more items are dispensed into the receiving unit. In some embodiments, the second data stream may comprise one or more images or videos of the receiving unit after the one or more items are dispensed into the receiving unit.

In some cases, the filtered set of images or videos may be generated based on a user input or a user selection of criteria and information that the user desires to filter the images or videos based on. In some cases, the filtered set of images or videos may be organized in a chronological order. In some cases, the filtered set of images or videos may be generated using a third data stream comprising a plurality of images of a dispense unit transporting the one or more items from the tray or dispensing the one or more items into the receiving unit.

In some cases, the images or videos from the first and second data streams may be filtered or sorted by VLS, LFB, SKU, product categories, product shape, product materials, product weights, dispense order, what SKUs are already in the receiving unit, state of the receiving unit before or after a dispense, failures in other sensors (that are part of dispensing process), failure modes, or any combination of the preceding criteria or factors. Such filtering or sorting may also be performed for specific trays, and may take into account a number of items in a lane, a lane size, VLS environment, SKU, materials, etc.

In some cases, the processor may be configured to track or detect a type of items dispensed, a quantity of items dispensed, a dispense location for each item, a success rate of dispensing the item in a target location, a movement of the item during dispense, or one or more properties of the one or more items, based on the filtered set of images. The processor may be configured to look for errors where the wrong product is given or the wrong count is provided. The processor may track where items were supposed to land in the receiving unit. The processor may track properties of the items, the success rate of the dispensing to hit the target, and/or where an item ends up after dispensing in order to use that information to train one or more machine learning models that can be implemented to improve the quality and success of future dispense routines.

In some cases, the processor can be configured to track if an item comprises glass and direct the product handling system to avoid or prevent other glass items from dropping directly onto the item. The processor can also track a movement of an object that can open on an impact like a clamshell of berries. In some cases, the processor can also a movement of an object with a protrusion that can damage other things (e.g., product stem, box corner, etc.). In some cases, the processor can track an orientation of an object. This can help the processor to control an operation of the product handling system to allow, for example, dropping a peach on the flat side of a box, but avoiding or preventing scenarios where the peach is dropped onto the corner of an item or product.

In some cases, the processor may be further configured to perform object tracking to isolate the one or more items from a background feature. This can allow a single object to be picked out from other objects in the bag. In some cases, the processor may be further configured to perform blob detection, edge detection, or contour detection to determine one or more attributes of the one or more items and to detect a quantity, an orientation, or a location of the one or more items. In some cases, the processor may be configured to track or determine item count and item location. In some cases, the processor may be further configured to filter out background features based on a color, hue, tint, tone or shade of the background features. In some cases, the processor may be further configured to filter out the background features by (i) transforming the plurality of images from a red green blue (RGB) color space to a hue saturation value (HSV) color space or (ii) comparing depths using one or more depth point clouds. In some cases, the depth map may be used to determine item filling results. In some cases, the processor may be configured to determine a probability distribution of where the one or more items are located or dispensed in the bag, based on the plurality of images, the one or more depth point clouds, and a target location for dispensing the one or more items.

In some cases, the processor may be configured to automatically detect if the one or more items have successfully dispensed. The processor may also be configured to automatically detect if one or more items failed to dispense. In some cases, the processor may be configured to compare the filtered set of images to a customer order to verify successful dispensing of the one or more items. In some embodiments, the processor may be configured to use at least the filtered set of images to train one or more machine learning models to confirm dispense accuracy and detect dispense errors.

In some embodiments, the processor may be configured to train the one or more machine learning models based on a property or a characteristic of the one or more dispensed items, which property or characteristic is determined based on one or more images or videos from the first data stream or the second data stream. Such property or characteristic may be, for example, material or quantity. In some cases, the processor may be configured to use the subset of images to train one or more machine learning models.

In some cases, the processor may be configured to provide at least a subset of the plurality of images or videos to an operator for order verification upon detecting an error or an inconsistency between two or more dispense sensors. In such cases, the operator can manually use the information to troubleshoot a problem. In some cases, the system may further comprise a communications module configured to provide the filtered set of images to a customer to provide live updates during order fulfilment and to allow the customer to (i) check for fulfilment accuracy, quality, or item damage, or (ii) provide live feedback on an order fulfilment process.

In some cases, the processor may be configured to build an order fulfillment history based on the filtered set of images and to identify a dispense routine that caused an error. The error may indicate, for example, a missing item, a wrong item, or an extra item. In some cases, the processor may be configured to determine one or more quality issues with one or more items that are damaged during dispensing, based on the filtered set of images. The processor may be configured to use computer vision to detect one or more dispensing actions that cause damage to one or more items, based on physical interactions between various items during dispensing (e.g., a first item in or on the receiving unit and a second item being dispensed into or onto the receiving unit).

In some cases, the one or more machine learning models may be configured to determine or predict when one or more items having a high risk of interaction may be dispensed together or next to each other. Such high risk of interaction may be determined based on one or more properties or attributes of the one or more items. In some cases, the high risk of interaction may correspond to a risk of spilling, a risk of damaging the one or more items, a risk of damaging an item packaging, or a puncture in an item or an item packaging.

In some cases, the processor may be configured to verify correct item type, quantity, position, orientation, seating, or placement in the one or more trays based on the first data stream or the second stream or both. The first data stream may correspond to one or more items that may be or that are being transported from a tray, and the second data stream may correspond to one or more items that are being dispensed into or onto a receiving unit. The first and second data streams may be evaluated together as some errors may only show up in one of the two data streams.

In some cases, the processor may be configured to use the first data stream and/or the second data stream to track what item(s) were dispensed, their quantity, the dispense target for each item, and associated characteristics of those item(s), including dimensions, shape, color, size, weight, rigidity, etc.

In some embodiments, the system may further comprise an imaging unit configured to image the one or more items during item induction or item storage to evaluate item quality. In other embodiments, the system may further comprise an imaging unit configured to monitor a movement or a navigation of one or more robots and to provide one or more corrective adjustments to the one or more robots based on the monitored movement or navigation.

In some embodiments, the order fulfilment management system may comprise one or more imaging devices configured to capture a plurality of data streams. The plurality of data streams may comprise, for example, image or video data. In one example, the system may capture multiple data streams for an item or a process involving the item. In some cases, the multiple data streams may correspond to when the item goes on a tray (e.g., to check for accuracy of item selection and whether the correct item was placed in the right location), when the item is stored to check quality, when the item is in the tray before the item is lifted for dispense (e.g., to check for accuracy of item selection and whether the item is correctly positioned or oriented for lifting and dispensing from the tray), when the item is dropped or falling (e.g., to monitor the dispense process), when the item is in a bag or package, when the item comes to pick up in the bag or package, and/or when a consumer sends a picture of the item later (e.g., if the item is damaged or an incorrect item was selected or dispensed). In some cases, the multiple data streams may include images or videos of the image as the item is being dispensed (e.g., when the item is falling into a bag or package after a dispense operation).

In some embodiments, one or more live image/video streams may be analyzed in real-time (e.g., using one or more algorithms) to extract information about one or more items or subsystems (e.g., subsystems for dispensing, transportation, induction, or handling of various items or products) and to provide immediate feedback to operators/equipment. For example, the real-time algorithmic analysis may include tracking items in space as they are repositioned within a system (e.g., during a placement of the items in a storage tray, or during a movement of the items during a shuffling or item reordering operation, and the like), tracking items as they are moved from one system to another (e.g., during a dispensing of an item from a tray to a receiving system, or during a movement or a transport of a tray from a storage position to a dispense system), and/or tracking items as they are moved by a human to a storage system (e.g., when an operator loads an item into a tray lane). In some cases, the real-time algorithmic analysis may include real time verification and detection of failures/errors to standard actions/operations, which can be used to provide immediate feedback to operators or equipment.

In some embodiments, one or more sensors can be mounted on actuation systems, which can allow the sensors to be repositioned or reoriented for optimally detecting items and operations, events, or systems of interest during actions/operations of a product handling and dispensing system. For example, a stepper motor can be used to control the position of a camera mounted on a linear rail. During a series of time steps, a field of view of a camera can be adjusted to captured a dispense sequence. In some cases, a robot can be fixed in place. A camera on a linear rail can be actuated in a desired direction (e.g., towards a robot or a bag) to track a receiving system in order to capture and detect valuable information during a dispense sequence. In another example, a camera can be mounted along one or more axes of a robot, and the robot can manipulate the axes to bring the camera into an optimal viewing position of an item, an event, or a subsystem.

Remote Inspection of Automation Quality

In some embodiments, Pre-Dispense and Post-Dispense images can be compiled and sent to a remote user interface that can be used by an operator to provide judgements and corrective actions on dispense routines. These evaluations can happen in real time or after the occurrence of the dispense routines, depending on the application.

A similar method of streaming images of automation equipment and routines to remote user interfaces can be applied for many other applications throughout a store as well, including produce quality evaluation (e.g., Rapid Grading Tool for produce quality inspection during store induction, evaluation during storage in VLS systems, or evaluation during dispense or after produce has been dispensed into LFB bag), remote evaluation of tray inspection characteristics (e.g., correct item type in each lane, correct item quantity in each lane, correct item orientation in each lane, whether items are correctly seated in tray lanes and not riding up on lane dividers or tray edges, or whether items are loaded in a correct position and/or with a correct spacing within each lane), remote evaluation of LFBs (e.g., checking that LFBs/LFTs/LFCs are navigating correctly, on lines along floors or via floor markers, or checking for LFB/LFT/LFC collisions during navigation and supply corrective actions to recover from collisions), evaluation of the status of navigation and dispense area for spilled items, obstructions, damage to pathing, etc., evaluation of the status of the induction automation systems and VLS storage and dispense systems, and/or remote debugging and maintenance analysis of automation systems to improve uptime and response time to failure modes.

Method for Inspecting Images to Determine Quality Errors

In addition to determining dispense accuracy, dispense images can be used to evaluate potential quality issues, such as when items are damaged during the dispense process. By viewing a bag's complete image history of all dispense images/videos, operators can manually evaluate damage risk at each stage of the fulfilment process. For example, evaluations can be made based on which type of item has been dropped onto other item types.

In some cases, computer vision algorithms can be used to detect where items have landed in the bag after a dispense and these item locations can then be tracked during the fulfilment process. These systems allow for automated detection of cases where a dispense was high-risk for causing item damage, and bags can then be routed for manual review by a human operator.

Over time, this compiled data can be used to train machine learning models to predict when dispenses have occurred that include high-risk item interactions. In some instances, classical CV and ML techniques can also be used to detect if severe damage has been caused during dispenses. Examples include detecting spilled liquids, damaged boxes, dented cans, etc. The same techniques may be applied to images at other stages: induction, VLS storage, etc.

Mechanical Induction Design

Manual Induction—Higher Throughput Concepts

In order to improve throughput at manual induction, drawers can be automatically opened instead of manually pulling the tray out. The drawers can be used to cycle through a bottom up tray loader system and can present themselves to the operator at a faster rate as shown in the image. In some instances, an elevator may load empty trays into spot C. The empty tray may be moved to slot D when empty. The tray may be moved from slot D to slot A, and an operator may load items into the tray positioned in slot A. When finished, the operator may press a button confirming induction, one or more pictures of the tray may be taken, and the tray may be moved to slot B. From there, an elevator may pick up the tray containing the one or more items from Slot B. In some cases, the operator can be replaced by a robot. In some cases, a robot may be used to assist the operator.

Automated Induction

In some cases, an operator may induct a case from pre-induction storage into an auto-loading machine. The auto loading machine may be configured to open the box, take items out of the box, and place the items directly into one or more trays. In some cases, a series of conveyors, an XYZ pick gantry, or a robot arm may be used for automatic induction.

Load Cell for Data Collection During Tray Loading

When placing items in a tray or tote, load cells can be used to measure the weight of the items that are put into the receptacle. This data can be used for quality control of the process. Total weight added can be tracked to allow for the system to check that every manually placed item matches the recorded database's known weight of the item(s) that were to be added. Load cells in different locations (four corners for example) can also be used to gather data on the location of the weight that was added by comparing the signals from each sensor.

Break Beams or LiDAR to Measure Height

It is important to make the storage of trays very dense to better utilize the cost of the automation equipment. The VLS design uses a baker's rack type design to enable the system to place tray in the most-dense slot available. To do this, the height of the objects in the tray may need to be known. If the items are higher than expected, possible errors can occur that may cause the items to crash into the tray above it during insertion.

In some cases, break beams may be used to measure the height of the objects in the trays. Trays may pass through a series of break beams that are used to determine the maximum height of the items in the tray. If the two bottom beams are triggered but the third is not, it is safe to say that the items do not go as high as the 3rd beam. This sensor array may be located on the elevator so that the heights can be detected as the items go onto or off of the elevator. They can also be located at manual induction so that the issue can be caught before entry into the system.

In other cases, a planar LiDAR sensor may be used to measure the height of the objects in the trays. A single lidar sensor can be positioned with its plane normal to the elevator path. When a tray passes through the lidar plane of the sensor (which may comprise a single sensor that is rotating around a beam in a single plane), the trigger can be used to calculate the height of the items in the tray. The elevator position, the tray thickness, and/or the tray position may be determined. In some cases, the elevator position, the tray thickness, and/or the tray position may be known.

Hybrid Induction/Dispense VLS

A manual induction assembly may be positioned in the back of a dispense VLS. In such cases, one VLS can be used for both manual induction and for dispensing of items using a dispense assembly.

Light Placement

In some cases, LEDs may be placed underneath the tray to display to the operator where to load items in the tray. In other cases, an above head projector can be used to illuminate the item location within the tray. This illumination can be any generic shape. The illumination can also correspond to the shape/image of the item that is expected to go in that location. This is beneficial as items can go into the tray in many different orientations. The projection can properly project the correct orientation of an item within the tray.

Laser Guide

In some cases, a laser can be mounted above the tray and directed at the correct placing location. This laser can be a line, pointing to a full lane, or a point, pointing to a specific point. This laser can also be mounted on an X-Y gantry, or on a X/Y pivot.

Factory Software Control

Parallel and Automated Fulfillment

The systems and methods disclosed herein can be implemented to achieve automated fulfillment with parallel workflows. In some cases, there may be multiple dispense stations working through their own queue of work. A dimensionless cost function may be utilized to autonomously make all of the decisions that are required to ensure the fastest and highest quality route, not just fulfilment time. The dimensionless cost function may also take into consideration item damage, bag packing density, product mixing.

In some cases, the system may need to pick the order of the items and may need to monitor and evaluate the state of the bag to determine the order of items to put in. This may require a complicated cost function that is computed and evaluated in a fully autonomous fashion, since every LFB may need to navigate in dynamic ways to reach its various destinations, which is different than other systems that may move all items to one location for picking.

Algorithm for Determining Path Routing for Fulfilment

In some cases, the system may be configured to implement an algorithm for determining path routing for fulfilment. The system may utilize a graph search with custom heuristics that penalize occupied nodes, specific edges, and additional turns which take time. Robots may be assigned a set of nodes to cover at a time, and these nodes may be reserved for a certain time period or during the fulfillment of a particular order so that no other robot can use those nodes until the nodes have been unreserved. To account for a constantly changing map, the robots may be configured to recalculate their paths when they have been stuck in traffic for a certain amount of time or if they are deadlocked with another robot trying to get to its current node. In some cases, the system may provide for custom designed path networks that include different types of edges, including highways and local streets, and queueing locations. Robots may only take certain edges based on their destination. For example, robots going to another section of the map can take the highway, whereas robots going to a dispense location may come off the highway onto a local street.

Algorithm for Determining Dispense Order

In some cases, the system may be configured to implement an algorithm for determining dispense order. The system may be configured to compute a cost for each item based on the mass or volume of the item, a drop surface area, and/or a packaging material. Objects with larger mass over drop surface area may have a higher cost. Objects with harder packing material such as aluminum or steel may also be given higher costs through a multiplicative factor. The drop order may then be calculated based on these absolute costs. If the difference between the drop cost of two items at the same storage bay is greater than the difference between the drop cost of the smaller item and an item at different bay, the robot may elect to go to the different bay first to retrieve that item.

Algorithm for Determining Inventory Location Optimization

In some cases, the system may be configured to implement an algorithm for determining and optimizing inventory location. For instance, the system may distribute copies of the same product to different areas on the map, to increase tolerance of individual machine failure. Within a storage bay, more frequently picked items may be placed in trays in the lower slots, to reduce the lift travel time. Items that are frequently purchased together may also be placed within the same tray, to reduce the number of trays that need to be retrieved.

Algorithm for Determining Item Location Among all Options when Picking Path and Dispense Order The system may be configured to implement a weighted cost optimization algorithm when determining the specific items and drop order for a bag robot. A cost is computed for each feature that the system cares about, including the travel time to the dispense location, how busy the dispense location is, and the relative order this item should be dropped to minimize damage in the bag. These costs may be weighted together to determine the final cost for each item. Additional cost features may be easily added to the equation without any change in code.

In some instances, instead of choosing all the items up front, the system may be configured to only pick the items at the next destination, in a "decide as you go" approach. This allows the system to adapt to potential state changes in the future, where machines may go down, specific items may become unavailable, or traffic may build up in a certain area of the map.

Product Handling Rules (Data System/Algorithm)

In some cases, the system may be configured to allow system operators to set a flexible set of rules for how different products can be handled in the fulfillment center. The system may be further configured to allow factory control software modules to follow one or more rules set by a system operator.

The system may comprise a plurality of layers. The first layer of the system may comprise an editable set of "features" or "tags" that can be assigned to products when they are onboarded (metadata entered to enable handling and sales). Some exemplary tags may include drip risk, unpackaged, chemical, food, non-food, meat or fish. The second layer of the system may comprise an editable set of "rule operators" that relate to decisions that the software may make when planning various processes. The rule operators may relate to which items can or cannot be stored above or below other items, or which items can or cannot be packed in a bag with other items. The final layer of the system may comprise a set of complete "rule statements" that combine features and rule operators. The rule statements may comprise, for example, [drip risk+meat or fish] [can't be stored above] [no packaging], or [chemical] [can't be packed in a bag with] [food]. These rules are editable in a graphical user interface. Different facilities can follow different rule sets (set by different partners, or even by grocery customers). The rules may be accessed and adjusted or updated via an API by the control software to constrain product handling decisions, such as determining where to place a tray or how to split an order into multiple bags. In some embodiments, a machine learning algorithm may be trained to suggest feature classifications from images of a new product, to make onboarding faster.

Bag State Tracking

In some cases algorithms can be implemented for selecting optimal targets for dispensing items into LFB bags using three primary inputs: an RGB image, a depth point cloud, and the item's attributes (its dimensions, shape, weight, etc.).

In some cases, bag state tracking may be implemented. Bag state tracking may comprise storing, updating, and retrieving the critical information about an LFB's state throughout the fulfillment process, which can then be used to optimize the fulfilment process in numerous ways. One way is by improving the dispense target algorithms during dispense.

The state of the bag can consist of many types of information, but the critical components include: the RGB images associated with the bag (most recent Pre-Dispense and Post-Dispense images), the entire compiled history of images/videos, a depth grid map of the bag, an average depth in each region of the bag, a number of detected depth points in each region of the bag, a max depth in each region of the bag, a min depth in each region of the bag, a variance in depth in each region of the bag, an item grid map, the locations of each item already in the bag, along with associated information such as the item's material properties (dimensions, color, weight, size, shape, damageability characteristics, etc.), product ID w/associated metadata, or the level where the item is located (on the surface of the bag, or below). Alternatively or in addition, the item locations can be represented as probability distributions.

The resolution of the depth grid maps or item grid maps can be adjusted to balance accuracy and processing speed. In some cases, different resolutions may be used for a depth grid map for the average depth in different bag regions. The depth and item grid maps can be structured to provide information not only about items on the surface of the bag, but also for items deeper into the bag that may be covered by items on the surface. This is important for reducing damage to items during dispense that may be impacted even if they are not on the surface of the bag.

Tracking the bag state during fulfillment allows for other applications in addition to optimizing dispense target algorithms, such as optimizing fulfilment speed and LFB routing, using state information to reduce the number of images taken of the LFB during each dispense routine (one dispense routine's post-image can be used as the next routine's pre-image), simulating and evaluating if there is a viable target for the next item dispense into an LFB based on the current state (e.g., avoiding sending an LFB to a VLS and then needing to reject it, which wastes time), real-time selection of best LFB for an individual item dispense, optimizing the order that items are dispensed into bags to optimize speed (e.g., through simulation of order before fulfilment begins or simulation in real-time as LFBs are deployed and collecting items), improving bag packing efficiency (getting as many items into a single bag as possible) by optimizing the splitting of an order's items into different bags (e.g., through simulation of order before fulfilment begins, simulation in real-time as LFBs are deployed and collecting items, or by detecting if items shift in between dispenses), reducing damage during dispense by providing better dispense targets, based on known locations of current items in the bag and their damage characteristics, or improved monitoring (on site or remote) of LFB states during fulfillment for monitoring and debugging purposes.

Dispense Order Optimization Factors/Cost Features

The optimization factors and cost features may be associated with throughput. Such factors and features may include, for example, LFB Travel time to bay, status of bay (busy/free), robot traffic, and robot trajectories.

The optimization factors and cost features may be associated with damage reduction. Such factors and features may comprise individual item characteristics: mass, drop surface area, packaging material, sharpness, mass/drop surface area, item damageability "score" based on how likely to be damaged ("fragility score") or how likely to cause damage ("damage score"). In some cases, the damage reduction factors and features may be mapped to an item-item interaction matrix, by individual products and/or by product group characteristics.

The optimization factors and cost features may be associated with bag packing efficiency and ease of bag handling. Such factors and features may be used to prevent items from sticking out of bags and to determine if a bag is below threshold weight.

The optimization factors and cost features may be associated with freshness and food safety. Such factors and features may be used to determine if an item is perishable, and if an item should be temperature controlled and dispensed later.

In any of the embodiments described herein, the system may provide a visual presentation of an order to a consumer. The visual presentation may correspond to one or more steps of an order fulfilment or a particular item or set of items of the order.

Algorithms

The algorithms may comprise one or more weighted cost algorithms. In some cases, the algorithms may use mass/surface area ratio or material damage properties to make decisions.

The algorithms may use deterministic planning. The system may pick an optimal dispense order before a bag is deployed, based on expected state of bays and inventory at time order is placed. In some cases, the algorithms may simulate or predict bay availability, future states of bag, space for new items, and item-item interactions during drop.

In some cases, the algorithm may be a traveling salesman algorithm. In such cases, the systems and methods can be implemented to give a baseline plan which may be updated with other algorithms during fulfilment.

In some cases, the algorithms may implement a "decide as you go" with online updates. The algorithms may adapt to state changes during fulfillment, including changes in bag states, bay states, error handling, inventory availability changes, and/or LFB traffic. The algorithms may check a cost of the next single upcoming dispense and/or look forward a certain number of steps with simulated rollouts.

In some cases, the algorithms may implement one or more learning methods. The learning methods may comprise, for example, data mining on past orders to optimize weighted cost algorithms, or reinforcement learning with rewards based on preferred factors.

In some cases, the algorithms may permit human in-the-loop and/or manual interventions when one or more aspects of the algorithms or simulation fail. The human in-the-loop and/or manual interventions may include end-consumer interventions during fulfilment.

State Information

In some cases, the optimization algorithms may be configured to allow for dynamic adjustments of planning and routing of robots during fulfilment. These optimization algorithms can make use of many different components, properties, or characteristics of the factory's state at any given time, including, for example, inventory information (e.g., item availability and locations of items, or ease of access of inventory based on state of bays, trays, and/or lifts), storage bay information (e.g., is a bay in use, or free, or down for maintenance, or are there other robots planning to use the bay?), LFB information (e.g., LFB current locations, planned trajectories and planned order of dispenses for each LFB, intended trajectories to get to the next dispense, or battery level), and/or bag information (e.g., state of bags, including latest images, depth information, and item locations in bag).

Parallel and Automated Fulfillment

In one aspect, the present disclosure provides an automated fulfillment system comprising: a plurality of dispense stations comprising a movable mechanism for dispensing one or more items; a plurality of receiving units configured to travel to one or more of the plurality of dispense stations along one or more adjustable paths to receive the one or more items dispensed from the plurality of dispense stations; and one or more processors configured to modify or update the one or more adjustable paths for at least one receiving unit of the plurality of receiving units based on an algorithm comprising a cost function that optimizes one or more order fulfilment metrics based on (i) an availability of the one or more items at the dispense stations and (ii) an availability of one or more of the plurality of receiving units to receive the one or more items. The one or more modified or updated paths may be optimized to reduce a probability of item damage during or after a dispense routine, avoid or mitigate an occurrence of one or more failure modes, or service one or more customer preferences. In some embodiments, the one or more order fulfilment metrics may comprise, for example, throughput, output efficiency, order fulfilment speed, packing density, or item compatibility.

In some cases, the processors may be configured to update the one or more adjustable paths when a new order is received. In some cases, the processors may be configured to update the one or more adjustable paths when one or more additional receiving units are deployed to fulfill a new order. In some cases, the processors may be configured to update the one or more adjustable paths by changing an order or a sequence in which one or more of the receiving units travel to one or more of the plurality of dispense stations to retrieve items for an order. In some cases, the processors may be configured to update the one or more adjustable paths by changing an order or a sequence in which one or more of the receiving units retrieve the one or more items for an order.

The processors may be configured to determine the best combination of choices for operating the system using a cost function algorithm that tracks different order fulfillment properties. The order at which the receiving units go to each dispense station may change over time and/or instantaneously based on new information or new orders. Further, the storage areas may be associated with a particular dispense station or dispense tool such that the dispense station/dispense tool only dispense items received or originating from a specific storage area. The fulfilment system may comprise a series of pick and place robots that have AGVs that travel between them. The fulfilment systems of the present disclosure may be implemented to provide low cost dispense solutions that permit the use of multiple dispense tools to enable higher throughput. The specific dispense sequence for every order may be changed in order to gain some value, such as increased speed/throughput, reduced damage and failure modes, satisfaction of customer control/preferences, and increased packing density.

In some cases, the algorithm may be configured to determine an optimal path routing for at least a subset of the plurality of receiving units. In some cases, the algorithm may be configured to assign a set of nodes for one or more receiving units to cover at a time. The nodes may be selectively reserved so that no other receiving unit can use the nodes until the nodes have been unreserved. In some cases, the algorithm may be configured to perform a graph search with custom heuristics that penalize occupied nodes or movements that take additional time.

In some cases, the algorithm may be configured to account for a constantly changing map and to recalculate the optimal path routing for the plurality of receiving units when the receiving units are stuck in traffic for a predetermined amount of time or if one or more receiving units are deadlocked with another receiving unit that is trying to cover a same node. In some cases, the algorithm may be configured to generate or update a path network comprising different types of paths and queueing locations such that the one or more receiving units can only take a subset of the paths based on their destinations.

In some cases, the algorithm may be configured to determine a dispense order for the one or items dispensed by the one or more dispense stations. In some cases, the algorithm may be configured to compute a cost value for each item based on a mass of the item, a drop surface area, or a packaging material of the item. The algorithm may be configured to assign a higher cost value to objects with a larger mass over a drop surface area. The algorithm may be configured to assign a higher cost value to objects with harder packing material using a multiplicative factor. In some cases, the algorithm may be configured to determine an optimal drop order based on the cost value associated with each item. In some cases, the algorithm may be configured to direct a robot to travel to a second dispensing station to retrieve one or more items for a customer order if a difference between a drop cost value of a first item and a second item at a first dispensing station is greater than a difference between a drop cost value of the first or second item and a third item at the second dispensing station.

In some embodiments, the algorithm may be configured to determine an optimal location for inventory storage of the one or more items. In some cases, the one or more processors may be configured to distribute a plurality of items to a plurality of different storage units to increase a tolerance of individual machine failure, wherein the plurality of items comprise a same item. In some cases, the one or more processors may be configured to place more frequently picked items in one or more trays located on a lower shelf of a storage unit, to reduce a lift travel time. In some cases, the one or more processors may be configured to place items that are frequently purchased together within a same tray, to reduce a number of trays that need to be retrieved for order fulfillment.

In some cases, the algorithm may be configured to determine an optimal item location when picking a path and a dispense order. In such cases, the algorithm may be configured to implement a weighted cost optimization based on at least one of (i) a travel time to the dispense location, (ii) how busy a dispense location is, and (iii) a relative order in which one or more items should be dropped to minimize item damage during a dispense routine. In some embodiments, the algorithm may be configured to weigh one or more costs together to determine a final cost for each item.

In some cases, the algorithm may be configured to determine an item pick order based on potential state changes corresponding to machine failure, unavailability of items, or traffic build up in an area proximate to one or more dispense stations. In some cases, the algorithm may be configured to direct one or more robots to an order drop-off location if no unpacked items remain for a customer order. In some cases, the algorithm may be configured to (i) calculate a weighted cost value for each available tray, (ii) select a lowest cost value destination, (iii) select one or more items from the lowest cost value destination, and (iv) direct one or more robots to retrieve the one or more items from one or more trays associated with the lowest cost value destination, if unpacked items remain for a particular order.

In some embodiments, the algorithm may be implemented using one or more predetermined rules for handling the one or more items. The one or more predetermined rules may be set based at least in part on an editable set of features or tags that are assigned to one or more items when the one or more items are received or inducted. The editable set of features or tags may comprise, for example, a designation of drip risk, unpackaged, chemical, food, non-food, type of food, or type of non-food. In some cases, the one or more predetermined rules may be set based on an editable set of rule operators corresponding to one or more decisions associated with order fulfilment. In some cases, the one or more decisions may comprise a determination of whether an item can be stored above another item, or whether an item can be packed in a bag with another item. In some cases, the one or more predetermined rules may be set based on a set of editable rule statements that combine one or more features and one or more rule operators. In some cases, the one or more predetermined rules may be adjustable to constrain product handling decisions.

In some embodiments, the algorithm may comprise a machine learning algorithm that is configured to generate one or more feature classifications from one or more images of one or more newly received or inducted items to facilitate onboarding.

Item Quality Tracking

The present disclosures provides methods for inspecting dispense images to predict cases where item damage may occur, or for directly detecting damage that has occurred. In either case, those LFB bags can be directed to an area where a human can confirm the severity and potential cause of the damage. The compiled history of the bag's dispense images and/or videos can be used to further pinpoint where damage has occurred.

Each time item damage is detected and/or verified by a human operator, the resulting data can be stored and tracked for further use. Data mining and machine learning algorithms can then be used to reveal general trends and rules governing item-item interactions that lead to damage. The big data analysis can result in understandings of: (1) risk of damage to item type A when item type A is dispensed onto item type B, (2) risk of damage to item type B when item type A is dispensed onto item type B (example diagram, below left), (3) general risk to item type A when item type A is dispensed, and (4) general risk to item type B when any item is dispensed onto it.

In the above cases, a "type" of item can be defined as an individual SKU, or a product type, or a product group, or a material packaging group (metal, plastic, produce, etc.). The big data analysis can effectively find trends at all of these "type" resolutions. These findings can inform algorithms for choosing the best dispense location in a bag, in concert with Bag State Tracking. Furthermore, each dispense can then be given a score on how likely it was that damage occurred, based on the above findings as well as the detected location of where the item landed in the bag. If the risk score for a particular item, or for a particular dispense, or for a particular bag over cumulative dispenses becomes too high, the LFB can be flagged for manual review (either by a human operator or remotely with image/video history) before being sent to a customer.

Depth Cameras and Dispense Target Algorithm 3D depth and/or RGB cameras can be used to provide targets for dispensing items into bags. In some cases, HSV filtering of the RGB image stream can be used to filter out items in a bag from the bag itself. An example of using green hue HSV filtering is shown on the top right. Using the HSV color space allows for detection of the bag even in varying lighting conditions and textures of the bag. This is important for distinguishing which corresponding depth data points are referencing items instead of the bag itself.

The dispense target algorithm can also make use of physical models for how items fall into the bag as they are dispensed. The diagram on the below right shows an example of this: the algorithm searches for the best possible target, assuming that the item lands in the bag with a 90 degree rotation from how it rests in a VLS tray. A swing collision region is also evaluated at each potential target location, based on the dimensions of the item, to ensure that dispensed items do not collide with items already in the bag. In some embodiments, the dispense target algorithm can also provide dispense targets for multiple items simultaneously, to improve system throughput. In some cases, machine learning models can take as inputs the RGB image, depth data, and item dimension information and output optimal drop locations based on sets of compiled labeled training data from past dispenses.

In an alternate mode of system operation, the RGB image of the LFB bag can be sent to an operator interface, along with an overlay of the target showing a size of an item's dimensions. The operator can then manually select an optimal dispense target on the image, which can be immediately fed back into the system in real time to affect the dispense routine. The operator can be on site or at a remote location. This system can be used for every dispense or for instances when an automated dispense target algorithm fails.

Automated Tray "Breakpack" Loading

Breakpack is the process of splitting vendor-delivered quantities (e.g. a 12-pack of wine bottles) into smaller quantities for delivery to a fulfillment center. This is useful if, for example, a fulfillment center does not sell the wine very frequently, so storing all 12 bottles onsite would be an inefficient use of space. In a hub and spoke fulfillment network, large quantities of all SKUs may be delivered to a hub location. Largely homogenous trays (with few distinct products) can be loaded with high efficiency.

In the tray re-loading system shown and described herein, items may be conveyed out of homogenous trays on the left, onto a set of shuttle conveyors in the middle. The shuttle conveyors may move to a lane of a tray on the right, and deposit the items into a mixed tray. The shuttle conveyors may be configured to serve a plurality of layers of dispense assemblies (into the page). The mixed trays may then be shipped to "spoke" facilities with exact quantities of trays and/or items that the facilities need. This system may also work with a "shuttle" tray pick system, where the tray pick robots can move down aisle as well as up and down. In some cases, this system can also be used to empty one tray into others, so that it can be shipped empty back to a hub facility.

Customer Interface

Customer Facing VLS and Locker System on Pickup Side

Figure 10:
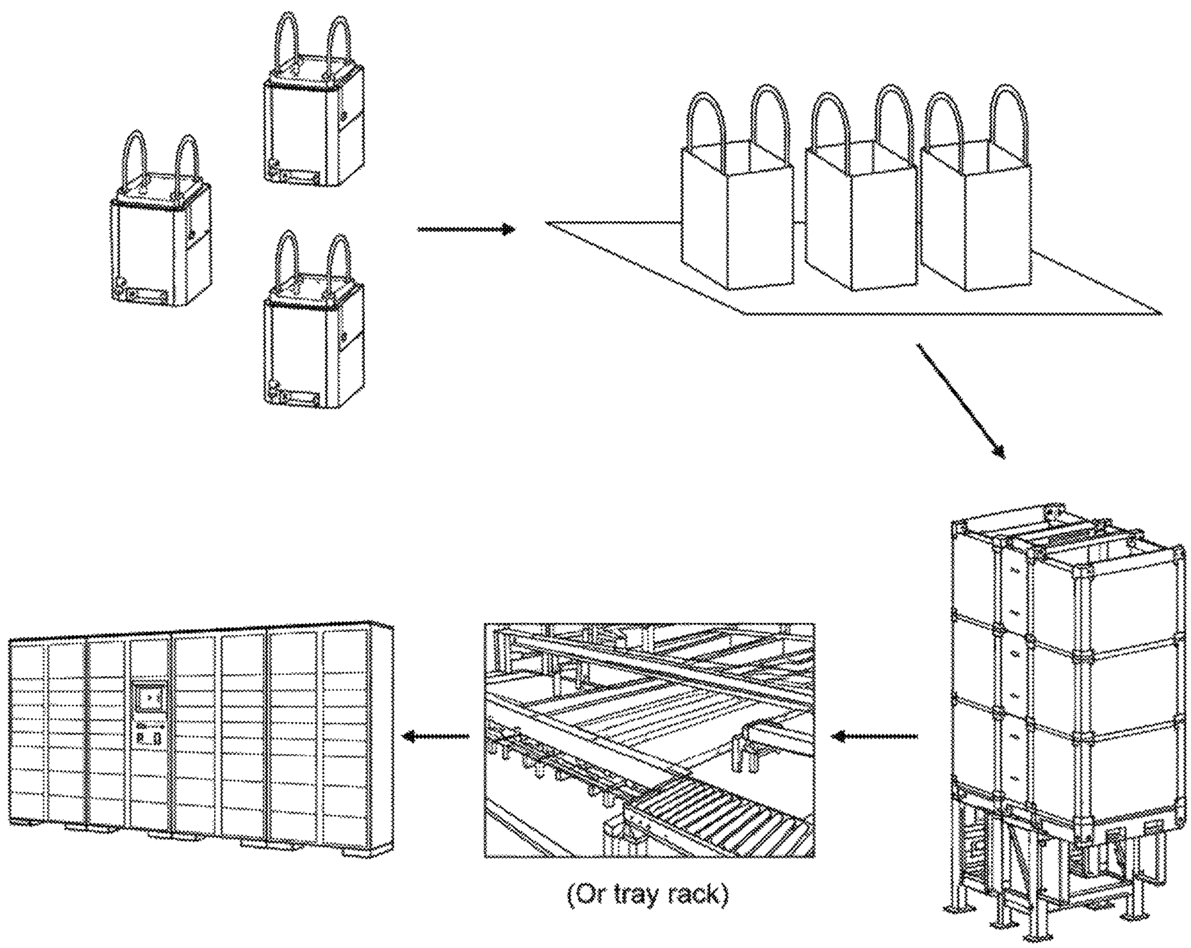
FIG. 10 schematically illustrates a locker system for customers to pick up orders, in accordance with some embodiments.

As shown in FIG. 10, to provide buffer storage at pickup and to better optimize interaction with customers, the following may be implemented using the systems and methods of the present disclosure: using robots to collect items for orders in multiple bags; using automated systems or subsystems to grab bags from robots and move one or more items from the bags into a tray; storing the tray in a buffer VLS with proper environmental conditions; and moving the tray and/or tray rack by conveyor or robot to a customer interfacing system when a customer is ready to pick up or receive the items on the tray. In some cases, the customer interface can be a locker type interface or any other type of high density/access point interface.

Pre-Induction Storage Tray Travel in Containers

Induction (i.e., loading of items onto or into trays) may be done at a central location or at a manufacturer or a distributor of items or goods. Full trays may be shipped to smaller, hub stores to be stored until purchased by a customer. Shuttles or any of the AGV AS/RS systems disclosed herein can be used for both storage and transport of one or more trays.

Floor Locking System for Tray Racks

If using tray racks, the racks can be driven on and positioned so the racks legs insert into a device on the floor and/or ceiling that locks the racks in place to minimize or prevent move during transport. The locks may be designed to not interfere with a rack lifting robot that would travel underneath the trays. The locks may be activated by the rack lifting robot when the rack is inserted, then deactivated when the rack lifting robot is ready to pick up the rack.

Wrapping Mechanism Around Tray Racks

A tray rack can be designed to protect the items from falling out or getting damaged. One approach is to use doors on the front where the tray is inserted. The doors can be configured to rotate around and to stop on the sides. Another approach is to wrap the racks in a flexible or hard material. In some cases, a blanket or plastic wrap can be used if one or more items on the racks are soft. In some cases, a wire cage or one or more walls can be used if one or more items on the racks are hard.

Inflatable Mechanism on Trays

In some cases, one or more inflatable devices can be placed over a tray to keep items in place and protected. In other cases, the items may be wrapped with a netting or other cover material.

Storage System Design

Airlock for Freezer

The storage system may include a double door entry providing an airlock to limit moisture and temperature infiltration to the conditioned space. For low temperature storage, temperature and dewpoint differentials to the dispense area can be the most extreme. As such, limiting any infiltration can help to reduce system cooling requirements, reduce power requirements, and improve conditions of food storage. Further, less moisture infiltration can help to reduce or minimize frost and condensate from forming on stored products.

Hot VLS

In some cases, a VLS may be conditioned for a dry bulb and dewpoint temperature for the purpose of keeping prepared foods in a ready to serve condition. For example, the VLS may be configured to maintain a temperature of at least about 60° C. The VLS may be configured to maintain temperature uniformity at minimal velocity, utilize waste heat from other refrigeration systems for heating, control temperature, and adjust a humidity up or down depending on the items stored in the VLS.

Ducting for VLS Air Distribution

A refrigeration system may be connected to a VLS via supply and return ducts. The duct system may be configured to distribute air across trays at various levels throughout the VLS. The duct may be configured to maintain temperature of air and product uniformity by distributing air. Such widespread air distribution can help to control humidity.

Add on Storage VLS

The VLS may have a shaft down the center with columns of trays in the front and the back. In some cases, the storage capacity of this design may be limited because it can only scale in an environment with a taller ceiling. A solution to this is to add more VLS's onto the backside that do not have any dispense capabilities. The storage would go down to the floor. This enables more storage per dispense, thus leveraging the cost of the dispense.

In some cases, trays may be transferred between two or more elevator shafts using a conveyor. Such a tray pass-through conveyor can be located anywhere along a height of the elevator shafts.

VLS Ante Room Concept

The add on storage may be used for refrigerated and/or frozen storage of items. The pass-through conveyor may have at least one door to a refrigerated VLS. The refrigerated VLS may act as an ante-room to keep condensation low and to minimize cooling losses.

Tray Down-Lane Dividers

In some cases, one or more tray dividers may be used to organize various items in a tray. The one or more dividers may include, for example, one or more tray down-lane dividers. Some tray configurations may hold one product per lane, and the items may not stack on top of each other. In one example, lane dividers can be added to any part of a lane of a tray to create lane sections where items can be stacked. The item stacks may remain stable and in the same place as the tray is moved around using an automated system. In some cases, a lane can have multiple dividers. In some cases, the lane dividers can have different heights. In some non-limiting embodiments, the lane dividers may comprise clip-on lane dividers. In some non-limiting embodiments, the items in a tray comprising one or more dividers can be picked from above by a gripper or a suction robot.

Automated Order Staging and Pickup System (Storage Lockers)

In one aspect, the present disclosure provides a system for automated order staging and pickup. An exemplary system may be configured for automated order staging and pickup. In some cases, mobile robots each carrying one or more packed grocery bags can stop at one or more stations. Stationary robots at the one or more stations can pick one or more bags out of the mobile robots and place the bag(s) onto one or more trays. The tray may be configured to hold multiple grocery bags, in some cases from different robots. In some embodiments, the trays can also hold products unsuitable for automated pick and pack, such as extra bulky items.

In some cases, the tray can be transported by a shuttle or gantry tray transport robot. The tray transport robot can move trays vertically and horizontally along an aisle of storage locations. In some cases, the tray transport can pick trays from and place trays into storage locations or lockers. Some storage locations or lockers can be accessible via automated doors. In some cases, one or more entities (e.g., human or robots) can pick up packed grocery bags and/or other grocery items from the trays stored in the lockers. In some cases, the locker locations may have automated doors on the backside as well for added safety, and to prevent people from reaching through to the tray transport robot working area. In some cases, the storage locations or lockers can be temperature controlled (e.g. refrigerator or freezer temperature ranges).

Automated Order Pickup System (Robots in Automated Bays)

In another aspect, the present disclosure provides a system for automated order pickup. In some cases, one or more robots may be configured to drive under a receipt printer before entering a pickup bay. In some cases, auto-cutting label printers can drop one or more receipts into one or more bags. The printing stations may comprise a printer mounted on a stand with a "chute" to guide the cut label into a robot's bag(s). In some cases, multiple printers can operate in parallel to print multiple receipts separately and simultaneously for delivery into one or more bags.

In some cases, customers can pick up bag(s) directly from a robot. The robot can enter the pickup bay from an automation system side and docks in the pickup bay. In some cases, the pickup bays have angled plates that guide the robot to a fixed position as it drives into place. In some cases, the pickup bays have a lid that is the interface between the automation system side and the human operations side. In some cases, the pickup bays can have tablets for people to interact with the pickup bay or to view information about their order pickup. In some cases, the pickup bays may comprise one or more lights to further guide or inform human interaction. In some cases, the pickup bays can have charging prongs embedded so robots can charge while "docked."

In some cases, the pickup bay lid can be locked closed until a robot is parked and locked into place (docked), and powered down or stopped. In some cases, a "roadblock" mechanism can be used to prevent the robot from rolling backwards in the bay. In some cases, a metal bar can be inserted in the "wheel-well" of the bot, in order to reduce the chance of an E-stop scenario. In some cases, the lid may be configured to automatically unlock for a customer once the robot is parked and E-stopped. If one or more sensors detect that a robot has been manually pushed out of the pickup bay, at least one or more of the other remaining bots in the facility may be E-stopped. In some cases, safety PLC can be used to controls this logic. In some cases, a lid sensor may be used to detect if a lid is broken open or electronically fails and can be used to initiate an E-stop protocol.

In some cases, the pickup bay lid may be configured to automatically close. In some cases, an electronic release mechanism may release the lid to be closed after one or more events occur. The events may include, for example, a robot detecting that its bag has been removed, a removal of the bag within a predetermined time, a failures to remove the bag within a predetermined time, a customer clicking a button on a tablet interface, and/or a customer pressing a lid release button. The events may be programmable in software. In some cases, the closing of the lid may be damped in the closing direction to prevent slamming.

Figure 13:
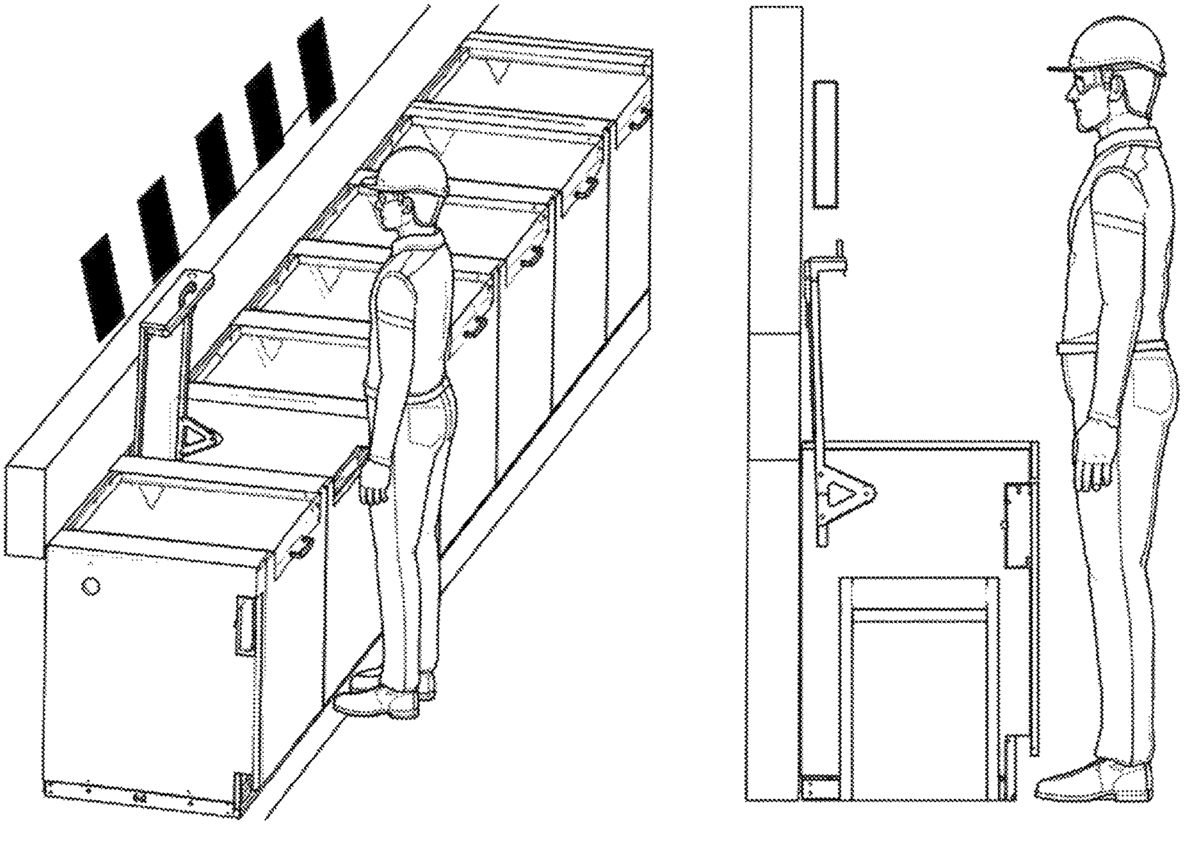
FIG. 13 schematically illustrates an interaction between a human or robot and a movable door or window of a pickup bay in order to retrieve one or more items or one or more bags, in accordance with some embodiments.

An exemplary configuration for a pickup system may comprise a plurality of pickup bays that are configured to contain one or more items or bags containing one or more items. In some cases, the pickup bays may comprise a movable door or window configured to provide access to the items or bags in the pickup bays. The pickup bays may allow a human or a robot to interact with the movable door or window to retrieve the items or the bags, as shown in FIG. 13.

An example of a pickup bay may comprise a lid. The lid may be a self-closing lid. In some cases, the pickup bay may comprise a lid sensor and a solenoid lock for restricting a movement of the lid relative to a body of the bay. In some cases, the pickup bay may comprise an embedded control printed circuit board (PCB). In some embodiments, the pickup bay may comprise a robot presence sensor for detecting if a robot is proximal to the bay or docked with the bay. In some embodiments, the pickup bay may comprise a charge port and/or a robot auto-stop. The robot auto-stop may comprise a component that restricts a movement or an operation of the robot either physically or electronically (e.g., by disconnecting a circuit or an electrical line or by triggering a locking mechanism or a stopped state using software). In some cases, the pickup bay may comprise LED lighting for indicating if the pickup bay is in use, or if a robot has been docked or undocked from the pickup bay, or if the pickup bay is ready to access or unavailable for use.

Figure 14:
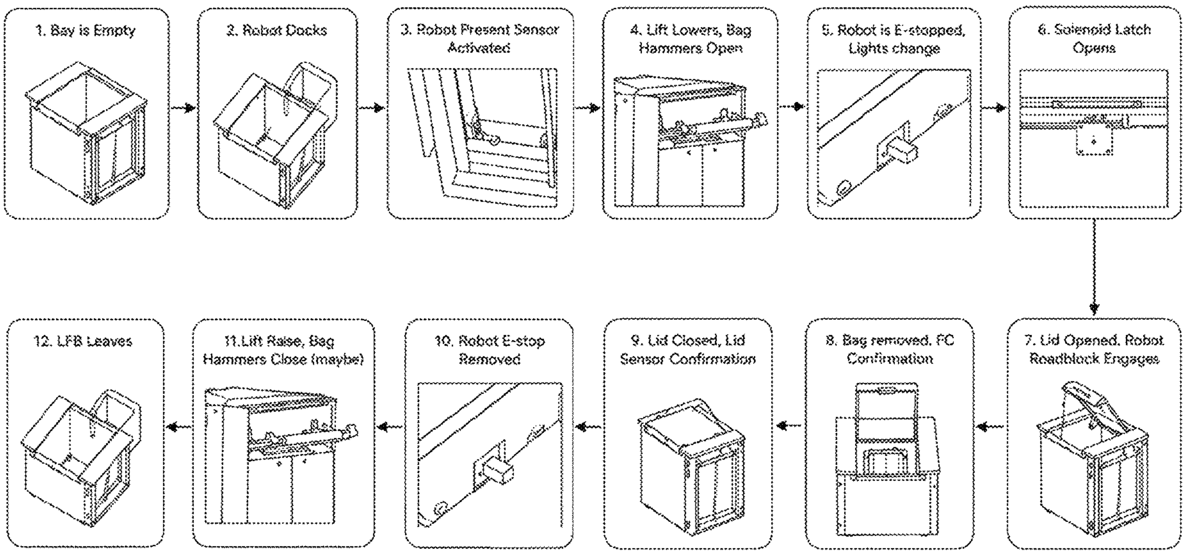
FIG. 14 schematically illustrates an exemplary interaction between a robot (e.g., a line following bag or LFB) and a pickup bay, in accordance with some embodiments.

FIG. 14 shows an exemplary interaction between a robot (e.g., a line following bag or LFB) and a pickup bay. The pickup bay may be initially empty. The robot may dock with the pickup bay. In some cases, a robot presence sensor may be activated. If the sensor detects the presence of the robot, a lift may lower, and a bag hammer may open. The robot may then be stopped. In some cases, a light may change to indicate that the robot is stopped. After the robot is stopped, a solenoid latch may open, a lid of the pickup bay may be opened, and a roadblock may engage. Once a bag is removed (e.g., by a robot or a human such as a consumer), the lid of the pickup bay can be closed. In some cases, the closing of the lid may be confirmed using a sensor (e.g., a touch sensor). Afterwards, the robot E-stop may be removed, the lift may be raised, and in some non-limiting embodiments, the bag hammers may close. Afterwards, the LFB may undock from the bay and travel to another location (e.g., to retrieve one or more other bags associated with a customer order, or to transport items or trays to storage bays or dispense stations.

Computer Systems

Figure 11:
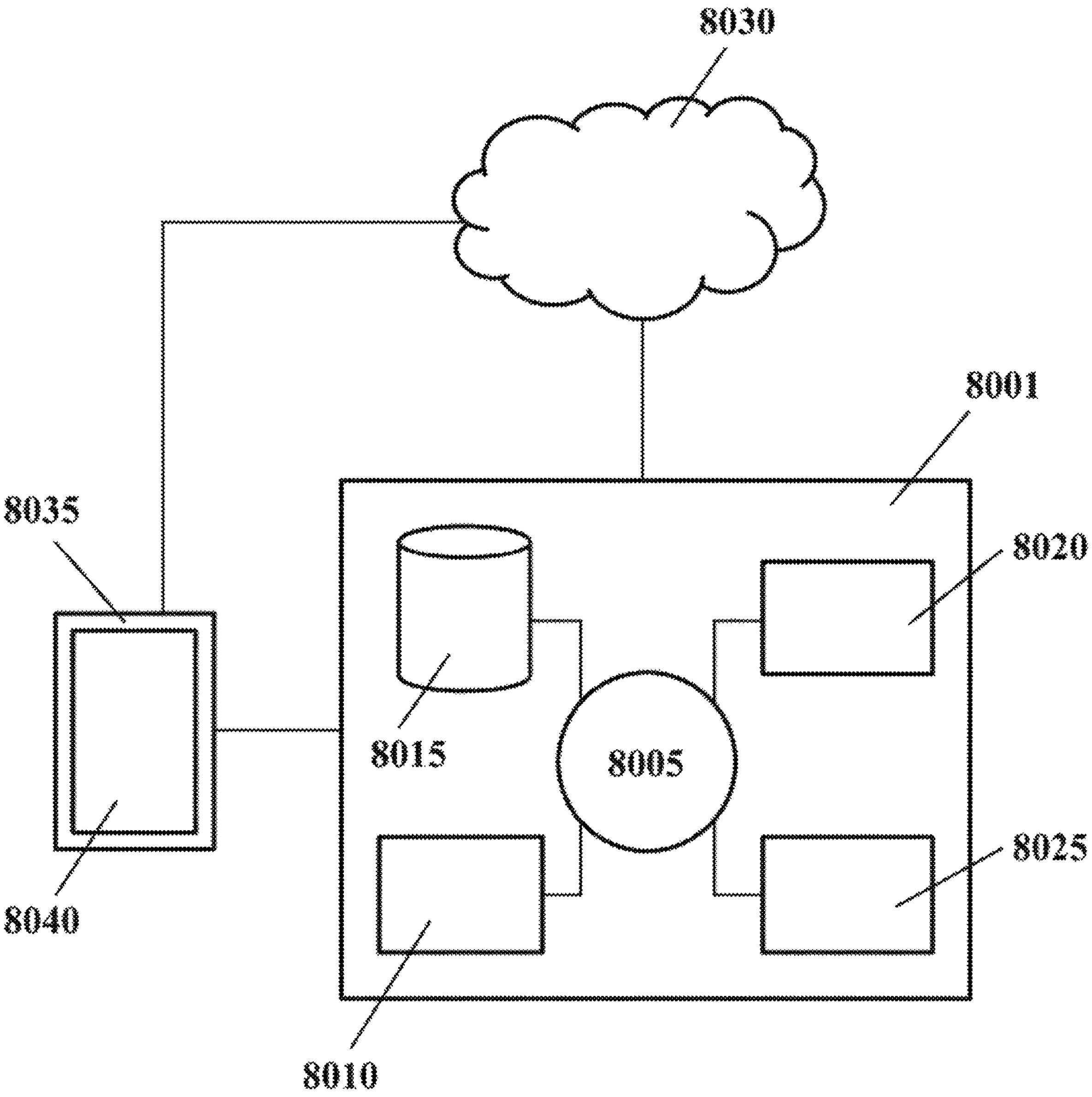
FIG. 11 schematically illustrates a computer system that is programmed or otherwise configured to implement methods provided herein.

In an aspect, the present disclosure provides computer systems that are programmed or otherwise configured to implement methods of the disclosure, e.g., any of the subject methods for product handling. FIG. 11 shows a computer system 8001 that is programmed or otherwise configured to implement a method for product handling. The computer system 8001 may be configured to, for example, modify or update a dispense order for one or more items, or to adjust one or more movements paths for one or more receiving units using a cost function that optimizes one or more order fulfilment metrics based on an availability of the one or more items at the dispense stations, an availability of one or more of the plurality of receiving units to receive the one or more items, or one or more newly received customer orders. The computer system 8001 can be an electronic device of a user or a computer system that is remotely located with respect to the electronic device. The electronic device can be a mobile electronic device.

The computer system 8001 may include a central processing unit (CPU, also "processor" and "computer processor" herein) 8005, which can be a single core or multi core processor, or a plurality of processors for parallel processing. The computer system 8001 also includes memory or memory location 8010 (e.g., random-access memory, read-only memory, flash memory), electronic storage unit 8015 (e.g., hard disk), communication interface 8020 (e.g., network adapter) for communicating with one or more other systems, and peripheral devices 8025, such as cache, other memory, data storage and/or electronic display adapters. The memory 8010, storage unit 8015, interface 8020 and peripheral devices 8025 are in communication with the CPU 8005 through a communication bus (solid lines), such as a motherboard. The storage unit 8015 can be a data storage unit (or data repository) for storing data. The computer system 8001 can be operatively coupled to a computer network ("network") 8030 with the aid of the communication interface 8020. The network 8030 can be the Internet, an internet and/or extranet, or an intranet and/or extranet that is in communication with the Internet. The network 8030 in some cases is a telecommunication and/or data network. The network 8030 can include one or more computer servers, which can enable distributed computing, such as cloud computing. The network 8030, in some cases with the aid of the computer system 8001, can implement a peer-to-peer network, which may enable devices coupled to the computer system 8001 to behave as a client or a server.

The CPU 8005 can execute a sequence of machine-readable instructions, which can be embodied in a program or software. The instructions may be stored in a memory location, such as the memory 8010. The instructions can be directed to the CPU 8005, which can subsequently program or otherwise configure the CPU 8005 to implement methods of the present disclosure. Examples of operations performed by the CPU 8005 can include fetch, decode, execute, and writeback.

The CPU 8005 can be part of a circuit, such as an integrated circuit. One or more other components of the system 8001 can be included in the circuit. In some cases, the circuit is an application specific integrated circuit (ASIC).

The storage unit 8015 can store files, such as drivers, libraries and saved programs. The storage unit 8015 can store user data, e.g., user preferences and user programs. The computer system 8001 in some cases can include one or more additional data storage units that are located external to the computer system 8001 (e.g., on a remote server that is in communication with the computer system 8001 through an intranet or the Internet).

The computer system 8001 can communicate with one or more remote computer systems through the network 8030. For instance, the computer system 8001 can communicate with a remote computer system of a user (e.g., an operator of the product handling system, a product handler, a grocery store, a consumer, an end user, etc.). Examples of remote computer systems include personal computers (e.g., portable PC), slate or tablet PC's (e.g., Apple® iPad, Samsung® Gala80 Tab), telephones, Smart phones (e.g., Apple® iPhone, Android-enabled device, Blackberry®), or personal digital assistants. The user can access the computer system 8001 via the network 8030.

Methods as described herein can be implemented by way of machine (e.g., computer processor) executable code stored on an electronic storage location of the computer system 8001, such as, for example, on the memory 8010 or electronic storage unit 8015. The machine executable or machine readable code can be provided in the form of software. During use, the code can be executed by the processor 8005. In some cases, the code can be retrieved from the storage unit 8015 and stored on the memory 8010 for ready access by the processor 8005. In some situations, the electronic storage unit 8015 can be precluded, and machine-executable instructions are stored on memory 8010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 8001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 8001 can include or be in communication with an electronic display 8035 that comprises a user interface (UI) 8040 for providing, for example, a portal for a product handler, a consumer, or a human operator to monitor a dispensing of one or more items into a container (e.g., a customer bag or a box). The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 8005. For example, the algorithm may be configured to track a dispensing of one or more items, or a movement of one or more receiving units. In some embodiments, the algorithm may be further configured to modify or update a dispense order for one or more items, or to adjust one or more movements paths for one or more receiving units using a cost function that optimizes one or more order fulfilment metrics based on an availability of the one or more items at the dispense stations, an availability of one or more of the plurality of receiving units to receive the one or more items, or one or more newly received customer orders.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. A product handling system comprising:
- a first tray comprising:
  - a first opening; and
  - a first set of supports:
    - arranged over the first opening;
    - defining a first set of lanes within the first tray; and
    - configured to support product units within the first set of lanes; and
- a first dispensing unit:
  - configured to transiently receive the first tray; and
  - comprising a first set of dispensing arms configured to:
    - pass through the first opening of the first tray toward the first set of supports;
    - elevate through a first lane, in the first set of lanes and defined between a first pair of supports in the first set of supports to lift a first row of product units, stored in the first lane between the first pair of supports, above the first lane; and
    - drive the first row of product units forward toward a first receiving area.

2. The product handling system of claim 1, further comprising a controller configured to:
- receive a customer order specifying a set of product types; and
- in response to the customer order specifying a first quantity of product units of a first product type stored in the first lane:
  - trigger a mobile robotic system to maneuver to the first receiving area; and
  - trigger the first set of dispensing arms to:
    - elevate through the first lane to lift the first row of product units above the first lane; and
    - drive the first row of product units forward toward the first receiving area to dispense the first quantity of product units of the first product type into a container transiently loaded into the mobile robotic system occupying the first receiving area.

3. The product handling system of claim 1, wherein the first tray is configured to:
- in a first configuration:
  - transiently store the first row of product units of a first product type in the first lane, the first product type comprising a canned good; and
  - transiently store a second row of product units of a second product type in a second lane, in the first set of lanes, adjacent the first lane, the second product type comprising a boxed good; and
- in a second configuration:
  - transiently store a third row of product units of a third product type in the first lane, the third product type comprising loose produce; and
  - transiently store a fourth row of product units of a fourth product type in the second lane, the fourth product type comprising a bagged product.

4. The product handling system of claim 1:
- wherein the first set of dispensing arms is configured to dispense product units, in the first row of product units of a first product type, stored in the first lane in a first configuration of the first tray; and
- wherein the first dispensing unit further comprises a second set of dispensing arms configured to:
  - pass through the first opening of the first tray toward the first set of supports;
  - elevate through the first lane to lift a second row of product units above the first lane, the second row of product units of a second product type different from the first product type and stored in the first lane between the first pair of supports in a second configuration of the first tray; and
  - drive the second row of product units forward toward the first receiving area.

5. The product handling system of claim 4:
- wherein each arm in the first set of dispensing arms comprises a bead chain;
- wherein the first set of dispensing arms is configured to dispense product units of the first product type comprising a boxed good; and
- wherein the second set of dispensing arms comprises a set of rollers configured to dispense product units of the second product type comprising loose produce.

6. The product handling system of claim 1:
- wherein the first dispensing unit is arranged within a first dispense station;
- wherein the first set of dispensing arms is configured to dispense product units of a first product type exhibiting a first product geometry; and
- further comprising:
  - a second tray comprising:
    - a second opening; and
    - a second set of supports:
      - arranged over the second opening;
      - defining a second set of lanes within the second tray; and configured to support product units within the second set of lanes; and a second dispensing unit:

arranged within a second dispense station adjacent the first dispense station;

configured to transiently receive the second tray; and comprising a second set of dispensing arms configured to:

pass through the second opening of the second tray toward the second set of supports;

elevate through a second lane, in the second set of lanes and defined between a second pair of supports in the second set of supports, to lift a second row of product units of a second product type, stored in the second lane between the second pair of supports, above the second lane, the second product type exhibiting a second product geometry different from the first product geometry; and drive the second row of product units forward toward a second receiving area.

7. The product handling system of claim 6:

wherein the first set of dispensing arms is configured to dispense product units of the first product type comprising a boxed good; and wherein the second set of dispensing arms is configured to dispense product units of the second product type comprising loose produce.

8. The product handling system of claim 1, further comprising:

a tray storage rack:

comprising a set of slots; and configured to transiently store the first tray in a first slot in the set of slots; and a tray routing conveyor configured to:

in response to detecting an assignment of the first receiving area to the first tray:

retrieve the first tray from the first slot in the tray storage rack; and locate the first tray within a first dispense station housing the first dispensing unit.

9. The product handling system of claim 1, wherein the first set of dispensing arms is configured to:

pass through the first opening of the first tray toward the first lane;

laterally expand to a first separation distance corresponding to a first width of the first row of product units, of a first product type, stored in the first lane;

pass through a second opening of the first tray toward a second lane, in the first set of lanes, defined by the first set of supports;

laterally retract to a second separation distance, less than the first separation distance, corresponding to a second width of a second row of product units, of a second product type, stored in the second lane, the second product type narrower than the first product type;

elevate through the second lane to lift the second row of product units above the second lane; and drive the second row of product units forward toward the first receiving area.

10. The product handling system of claim 1, wherein the first set of dispensing arms is configured to dispense the first row of product units forward toward a container transiently occupying the first receiving area, the container retrievable from a customer pickup bay by a customer.

11. The product handling system of claim 1:

further comprising a mobile robotic system configured to:

receive product units of product types specified in a customer order; and maneuver to the first receiving area in response to the customer order specifying a first quantity of product units of a first product type stored in the first lane; and wherein the first set of dispensing arms is configured to drive the first row of product units forward toward the first receiving area to dispense the first quantity of product units of the first product type into the mobile robotic system occupying the first receiving area.

12. The product handling system of claim 1, wherein the first set of dispensing arms is configured to:

maneuver to a first position aligned with the first lane;

lift the first row of product units, of a first product type stored in the first lane, above the first lane;

drive the first row of product units forward by a first distance based on a first dimension of the first product type to dispense a first product unit of the first product type into the first receiving area;

maneuver to a second position aligned with a second lane, in the first set of lanes, defined between a second pair of supports, in the first set of supports, in the first tray;

elevate through the second lane to lift a second row of product units, stored in the second lane between the second pair of supports, above the second lane, the second row of product units of a second product type different from the first product type; and drive the second row of product units forward by a second distance based on a second dimension of the second product type to dispense a second product unit of the second product type into the first receiving area, the second dimension greater than the first dimension, the second distance greater than the first distance.

13. The product handling system of claim 1, further comprising a controller configured to:

receive a customer order specifying a set of product types;

for a first product type in the set of product types specified in the customer order:

identify the first tray, in a set of trays, storing the first row of product units of the first product type;

retrieve a current location of the first tray; and assign the first receiving area to the first tray for dispensation of a product unit of the first product type from the first tray;

trigger a mobile robotic system to maneuver to the first receiving area; and trigger the first set of dispensing arms to:

elevate through the first lane to lift the first row of product units above the first lane; and drive the first row of product units forward toward the first receiving area to dispense product units of the first product type into a container transiently loaded into the mobile robotic system occupying the first receiving area.

14. A product handling system comprising:

a first tray comprising a first set of supports:

defining a first set of lanes within the first tray; and configured to support product units within the first set of lanes;

a first dispensing unit:

configured to transiently receive the first tray; and comprising a first set of dispensing arms configured to:

elevate through a first lane, in the first set of lanes and defined between a first pair of supports in the first set of supports, toward the first set of supports to lift a first row of product units, stored in the first lane between the first pair of supports, above the first lane; and drive the first row of product units forward toward a first receiving area; and a controller configured to trigger the first set of dispensing arms:

to elevate through the first lane toward the first set of supports to lift the first row of product units;

to laterally extend forward toward the first receiving area to locate distal ends of the first set of dispensing arms over the first receiving area; and to dispense the first row of product units forward toward the first receiving area.

15. The product handling system of claim 14, wherein the first tray is configured to:

transiently store the first row of product units of a first product type in the first lane; and transiently store a second row of product units of a second product type in a second lane, in the first set of lanes, adjacent the first lane, the second product type different from the first product type.

16. The product handling system of claim 14, further comprising a mobile robotic system configured to:

receive product units of product types, specified in a customer order and dispensed by the first dispensing unit, within a container transiently loaded into the mobile robotic system when occupying the first receiving area; and deliver the container to a storage locker, the container retrievable from the storage locker by a customer.

17. The product handling system of claim 14:

wherein the first dispensing unit is arranged within a first dispense station;

wherein the first set of dispensing arms is configured to dispense product units, of a first product type exhibiting a first geometry characteristic, from the first tray; and further comprising:

a second tray comprising a second set of supports:

defining a second set of lanes within the second tray; and configured to support product units within the second set of lanes; and a second dispensing unit:

arranged within a second dispense station adjacent the first dispense station;

configured to transiently receive the second tray; and comprising a second set of dispensing arms configured to:

elevate through a second lane, in the second set of lanes and defined between a second pair of supports in the second set of supports, to lift a second row of product units, stored in the second lane between the second pair of supports, above the second lane, the second row of product units of a second product type exhibiting a second geometry characteristic different from the first geometry characteristic; and drive the second row of product units forward toward a second receiving area.

18. The product handling system of claim 17, wherein the controller is configured to:

receive a customer order specifying a set of product types;

in response to the customer order specifying a first quantity of product units of the first product type stored in the first lane:

trigger a mobile robotic system to maneuver to the first receiving area; and trigger the first set of dispensing arms to:

elevate through the first lane to lift the first row of product units above the first lane; and drive the first row of product units forward toward the first receiving area to dispense the first quantity of product units of the first product type into a container transiently loaded into the mobile robotic system occupying the first receiving area; and in response to the customer order further specifying a second quantity of product units of the second product type stored in the second lane:

trigger the mobile robotic system to maneuver to the second receiving area; and trigger the second set of dispensing arms to:

elevate through the second lane to lift the second row of product units above the second lane; and drive the second row of product units forward toward the second receiving area to dispense the second quantity of product units of the second product type into the mobile robotic system occupying the second receiving area.

19. The product handling system of claim 14:

wherein the first tray is configured to transiently store the first row of product units of a first product type in the first lane, the first product type comprising a bagged product; and wherein the controller is configured to:

in response to receiving a customer order specifying a first quantity of product units of the bagged product, stored in the first lane:

trigger a mobile robotic system to maneuver to the first receiving area; and trigger the first set of dispensing arms to:

elevate through the first lane to lift the first row of product units above the first lane; and drive the first row of product units forward by a distance based on the first quantity of product units and a dimension of the bagged product to dispense the first quantity of product units of the bagged product into the mobile robotic system occupying the first receiving area.

20. A product handling system comprising:

a tray comprising:

a base; and a set of supports:

arranged over the base;

defining a set of lanes within the tray; and configured to support product units within the set of lanes; and a dispensing unit configured to:

transiently receive the tray;

pass through the base of the tray toward the set of supports;

elevate through a lane, in the set of lanes and defined between a pair of supports in the set of supports, to lift a row of product units, stored in the lane between the pair of supports, above the lane; and drive the row of product units forward toward a receiving area.

* * * * *